(12) United States Patent
Sugimura et al.

(10) Patent No.: US 11,143,443 B2
(45) Date of Patent: Oct. 12, 2021

(54) HEAT EXCHANGER

(71) Applicant: DENSO CORPORATION, Kariya (JP)

(72) Inventors: Ryohei Sugimura, Kariya (JP); Hiroshi Mieda, Kariya (JP); Masaaki Kawakubo, Kariya (JP); Daiki Kato, Kariya (JP); Tetsuya Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 117 days.

(21) Appl. No.: 16/091,944

(22) PCT Filed: Apr. 3, 2017

(86) PCT No.: PCT/JP2017/013977
§ 371 (c)(1),
(2) Date: Oct. 5, 2018

(87) PCT Pub. No.: WO2017/175726
PCT Pub. Date: Oct. 12, 2017

(65) Prior Publication Data
US 2019/0128575 A1 May 2, 2019

(30) Foreign Application Priority Data

Apr. 8, 2016 (JP) .............................. JP2016-078226
Mar. 31, 2017 (JP) .............................. JP2017-070724

(51) Int. Cl.
*F25B 39/04* (2006.01)
*F25B 43/00* (2006.01)
(Continued)

(52) U.S. Cl.
CPC .............. *F25B 39/04* (2013.01); *F25B 43/00* (2013.01); *B60H 1/00335* (2013.01);
(Continued)

(58) Field of Classification Search
CPC ........ F25B 2339/044; F25B 2339/0445; F25B 40/02; F25B 39/04
See application file for complete search history.

(56) References Cited

U.S. PATENT DOCUMENTS 5,101,640 A * 4/1992 Fukushima ........... F25B 49/027
62/196.4
6,516,628 B2 * 2/2003 Izawa ................ B60H 1/00914
62/324.6
(Continued)

FOREIGN PATENT DOCUMENTS

JP 4803199 B2 10/2011
JP 2014149123 A 8/2014

*Primary Examiner* — Christopher R Zerphey
(74) *Attorney, Agent, or Firm* — Harness, Dickey & Pierce, P.L.C.

(57) ABSTRACT

A heat exchanger includes: a heat exchanging portion configured to exchange heat between a refrigerant flowing through therein and air; a liquid reservoir configured to separate a gas-liquid two-phase refrigerant flowing out of the heat exchanging portion into a gas-phase refrigerant and a liquid-phase refrigerant, the liquid reservoir storing the liquid-phase refrigerant; and a refrigerant adjustment portion configured to adjust a flow state of the refrigerant flowing into the refrigerant adjustment portion through a refrigerant passage of the refrigeration cycle, supply the refrigerant to the heat exchanging portion and adjust an outflow state and an outflow destination of the refrigerant flowing out of the heat exchanging portion or the liquid reservoir. At least a part of the refrigerant adjustment portion is inserted into the liquid reservoir.

9 Claims, 20 Drawing Sheets

(51) Int. Cl.
*F28D 21/00* (2006.01)
*B60H 1/00* (2006.01)

(52) U.S. Cl.
CPC . *F25B 2339/047* (2013.01); *F25B 2339/0445* (2013.01); *F25B 2600/25* (2013.01); *F28D 2021/0084* (2013.01)

(56) References Cited

U.S. PATENT DOCUMENTS

| | | | | |
|---|---|---|---|---|
| 6,981,390 | B2 * | 1/2006 | Yamada | F25B 39/04 62/117 |
| 7,607,315 | B2 * | 10/2009 | Ohta | F25B 9/008 62/217 |
| 8,250,874 | B2 * | 8/2012 | Ikegami | B60H 1/00335 62/196.4 |
| 2002/0002841 | A1 * | 1/2002 | Izawa | B60H 1/00914 62/509 |
| 2009/0241573 | A1 | 10/2009 | Ikegami et al. | |

* cited by examiner

HEAT EXCHANGER

CROSS REFERENCE TO RELATED APPLICATIONS

This application is a U.S. National Phase Application under 35 U.S.C. 371 of International Application No. PCT/JP2017/013977 filed on Apr. 3, 2017. This application is based on and claims the benefit of priority from Japanese Patent Application No. 2016-078226 filed on Apr. 8, 2016, and Japanese Patent Application No. 2017-070724 filed on Mar. 31, 2017. The entire disclosures of all of the above applications are incorporated herein by reference.

TECHNICAL FIELD

The present disclosure relates to a heat exchanger.

BACKGROUND ART

Conventionally, for example as described in Patent Document 1 below, a refrigeration cycle device which uses this type of heat exchanger is known. The refrigeration cycle apparatus described in Patent Document 1 includes a gas-liquid separator for separating a refrigerant into a gas-phase refrigerant and a liquid-phase refrigerant, and a switching means for switching a refrigerant circuit, in which a refrigerant circulates, between a refrigerant circuit of a first mode and a refrigerant circuit of a second mode. Specifically, the gas-liquid separator separates the refrigerant flowing out of an outside heat exchanger into a gas-phase refrigerant and a liquid-phase refrigerant, discharges the gas-phase refrigerant from a gas-phase refrigerant outlet, and discharges the liquid-phase refrigerant from a liquid-phase refrigerant outlet. Further, the refrigerant circuit of the first mode is a refrigerant circuit that causes the liquid-phase refrigerant to flow out from the liquid-phase refrigerant outlet of the gas-liquid separator and into a second pressure reducing means and an evaporator, and further causes the liquid-phase refrigerant to be sucked into a compressor. The refrigerant circuit of the second mode is a refrigerant circuit that causes the gas-phase refrigerant to flow out from the gas-phase refrigerant outlet of the gas-liquid separator and to be sucked into the compressor.

PRIOR ART DOCUMENT

Patent Document

Patent Document 1: JP 2014-149123 A

SUMMARY OF THE INVENTION

Although there is no particular description in Patent Document 1, in the case where the valves constituting the refrigeration cycle is provided, it is preferable to provide the unit including the valves in the vicinity of the liquid reservoir in order to reduce the pressure loss of the refrigerant flowing out of the liquid reservoir. However, if the heat exchanger and the liquid reservoir are disposed in a front part of the vehicle, there may be a high possibility that the valves are exposed to water, and some measures are required. Also, especially when a refrigeration cycle is mounted on a moving body such as an automobile, restriction on arrangement space may be severe.

It is an objective of the present disclosure to provide a heat exchanger in which water is unlikely to contact valves in a configuration in which the valves of a refrigeration cycle are located close to the heat exchanger and a liquid reservoir, and the heat exchanger can be mounted even when the arrangement space is limited.

A heat exchanger according to a present disclosure is for a refrigeration cycle, and includes: a heat exchanging portion configured to exchange heat between a refrigerant flowing through therein and air; a liquid reservoir arranged along a lateral surface of the heat exchanging portion and configured to separate a gas-liquid two-phase refrigerant flowing out of the heat exchanging portion into a gas-phase refrigerant and a liquid-phase refrigerant, the liquid reservoir storing the liquid-phase refrigerant; a refrigerant adjustment portion configured to adjust a flow state of the refrigerant flowing into the refrigerant adjustment portion through a refrigerant passage of the refrigeration cycle, supply the refrigerant to the heat exchanging portion, and adjust an outflow state and an outflow destination of the refrigerant flowing out of the heat exchanging portion or the liquid reservoir. At least a part of the refrigerant adjustment portion is inserted into the liquid reservoir.

According to the present disclosure, since at least a part of the refrigerant adjustment portion is inserted into the liquid reservoir, the liquid reservoir can work for protecting from water. In addition, connection between the refrigerant adjustment portion and various flow paths is also easy by using the liquid reservoir.

EMBODIMENTS FOR EXPLOITATION OF THE INVENTION

Figure 1:
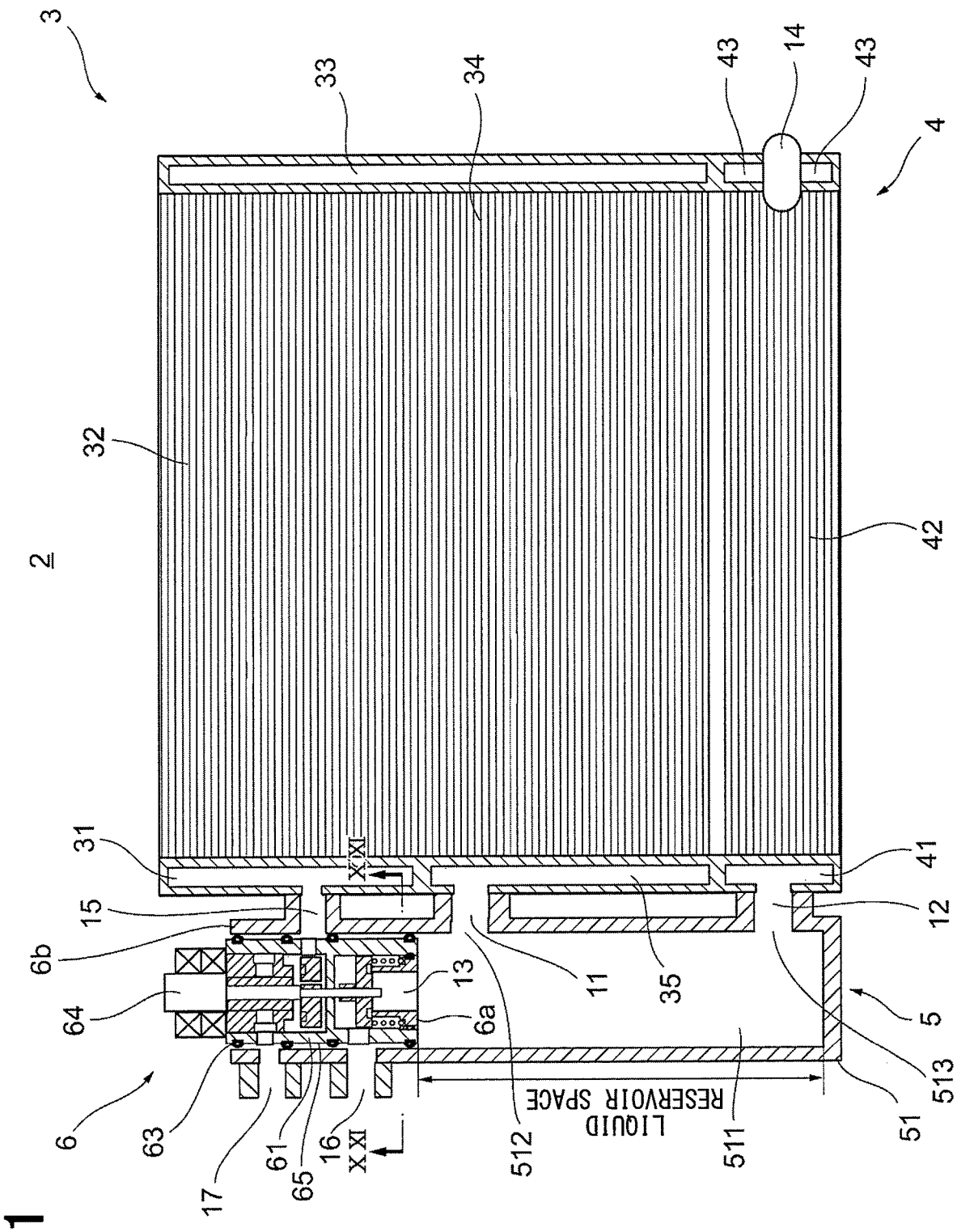
FIG. 1 is a view for explaining a heat exchanger according to an embodiment.

Hereinafter, the present embodiments will be described with reference to the attached drawings. In order to facilitate the ease of understanding, the same reference numerals are attached to the same constituent elements in each drawing where possible, and redundant explanations are omitted.

As shown in FIG. 1, a heat exchanger 2 according to a present embodiment includes an upstream heat exchanging portion 3, a downstream heat exchanging portion 4, and a liquid reservoir 5. The upstream heat exchanging portion 3 has two upstream cores 32, 34 and header tanks 31, 33, 35. In the present embodiment, the illustrated example is provided with two upstream cores 32, 34, but single core or three or more cores may be used. The upstream cores 32, 34 are parts that exchange heat between the refrigerant flowing therein and the air flowing outside, and includes tubes through which the refrigerant flows and fins provided between the tubes.

At the upstream end of the upstream core 32, the header tank 31 is attached. At the downstream end of the upstream core 34, the header tank 35 is attached. At the downstream end of the upstream core 32 and the upstream end of the upstream core 34, the header tank 33 extending across the both of the upstream core 32, 34 is attached.

A connection channel 15 is provided in the header tank 31. A connection channel 11 is provided in the header tank 35. The refrigerant flowing in from the connection channel 15 flows into the upstream core 32 through the header tank 31. The refrigerant flowing through the upstream core 32 flows into the header tank 33. The refrigerant flowing through the header tank 33 flows into the upstream core 34. The refrigerant flowing through the upstream core 34 flows into the header tank 35. The refrigerant flowing into the header tank 35 flows out to the connection channel 11. The connection channel 11 is connected to the liquid reservoir 5. The refrigerant flowing out to the connection channel 11 flows into a liquid reserving portion 51 of the liquid reservoir 5.

The liquid reservoir 5 includes the liquid reserving portion 51, the connection channel 11, a connection channel 12, and an outflow channel 13. The liquid reserving portion 51 is a portion that separates the gas-liquid two-phase refrigerant flowing in from the connection channel 11 into a liquid-phase refrigerant and a gas-phase refrigerant, and stores the liquid phase refrigerant.

The connection channel 11, the connection channel 12, and the outflow channel 13 are connected to the liquid reserving portion 51. The connection channel 11 is a channel connecting the upstream heat exchanging portion 3 and the liquid reservoir 5. The connection channel 12 is a channel connecting the liquid reservoir 5 and the downstream heat exchanging portion 4. The liquid-phase refrigerant flowing out from the connection channel 12 flows into the downstream heat exchanging portion 4. The outflow channel 13 is a flow passage that allows gas phase refrigerant to flow out from the liquid reservoir 5.

A liquid reservoir space 511 is defined in the liquid reserving portion 51. The inflow port 512 and the outflow port 513 communicate with the liquid reservoir space 511. The connection channel 11 is connected to the inflow port 512. The connection channel 12 is connected to the outflow port 513.

The downstream heat exchanging portion 4 has a header tank 41, a downstream core 42, and a header tank 43. An outflow channel 14 is connected to the header tank 43. The header tank 43 is provided at the downstream end of the downstream core 42. At the upstream end of the downstream core 42, the header tank 41 is provided. The connection channel 12 is connected to the header tank 41.

The liquid-phase refrigerant flows from the connection channel 12 into the header tank 41, and the liquid-phase refrigerant flows from the header tank 41 into the downstream core 42. The downstream core 42 is a part that exchanges heat between the refrigerant flowing therein and the air flowing outside, and includes tubes through which the refrigerant flows and fins provided between the tubes. Accordingly, the liquid-phase refrigerant flowing into the downstream core 42 is directed to the header tank 43 while being subcooled.

The liquid-phase refrigerant flowing into the header tank 43 from the downstream core 42 then flows out to the outflow channel 14. The outflow channel 14 is connected to an expansion valve included in the refrigeration cycle apparatus, and an evaporator is connected after the expansion valve.

Above the liquid reservoir 5, a refrigerant adjustment portion 6 is provided. An inflow channel 17 and a connection channel 15 are connected to the refrigerant adjustment portion 6. The inflow channel 17 is a flow passage through which the high-pressure refrigerant from the compressor flows in. The connection channel 15 is a channel through which the inflowing refrigerant is let out at high pressure as it is or low pressure and flows out toward the upstream heat exchanging portion 3.

The outflow channel 13 and the compressor connected passage 16 are connected to the refrigerant adjustment portion 6. The outflow channel 13 is a channel in which the gas-phase refrigerant flowing out of the liquid reservoir 5 flows. The compressor connected passage 16 is a flow path for sending the refrigerant flowing therein to the compressor.

The refrigerant adjustment portion 6 includes a body portion 61 in which a valve body and a valve seat is provided, a sealing portion 63, and an actuator 64 for actuating the valve body. A void space 65 is formed between adjacent sealing portions 63. The void space 65 is a portion where the refrigerant adjustment portion 6 and the liquid reservoir 5 are spaced from each other. The sealing portion 63 functions as a buffer member defining the void space 65 and as a refrigerant leakage limiting member in an inside passage of the refrigerant adjustment portion 6.

As described above, the heat exchanger 2 according to the present embodiment includes: the upstream heat exchanging portion 3 and the downstream heat exchanging portion 4 which exchange heat between the refrigerant flowing therein and the air; the liquid reservoir 5 that is arranged along one lateral surface of the upstream heat exchanging portion 3 and the downstream heat exchanging portion 4, separates the gas-liquid two-phase refrigerant flowing out of the upstream heat exchanging portion 3 into the gas-phase refrigerant and the liquid-phase refrigerant, and stores the liquid-phase refrigerant; and the refrigerant adjustment portion 6 which adjust a flow state of the refrigerant flowing therein through the refrigerant passage of the refrigeration cycle, supply the refrigerant to the upstream heat exchanging portion 3, and adjust an outflow state and an outflow destination of the refrigerant flowing out of the downstream heat exchanging portion 4 or the liquid reservoir 5. A part of the refrigerant adjustment portion 6 is inserted into the liquid reservoir 5.

Figure 2:
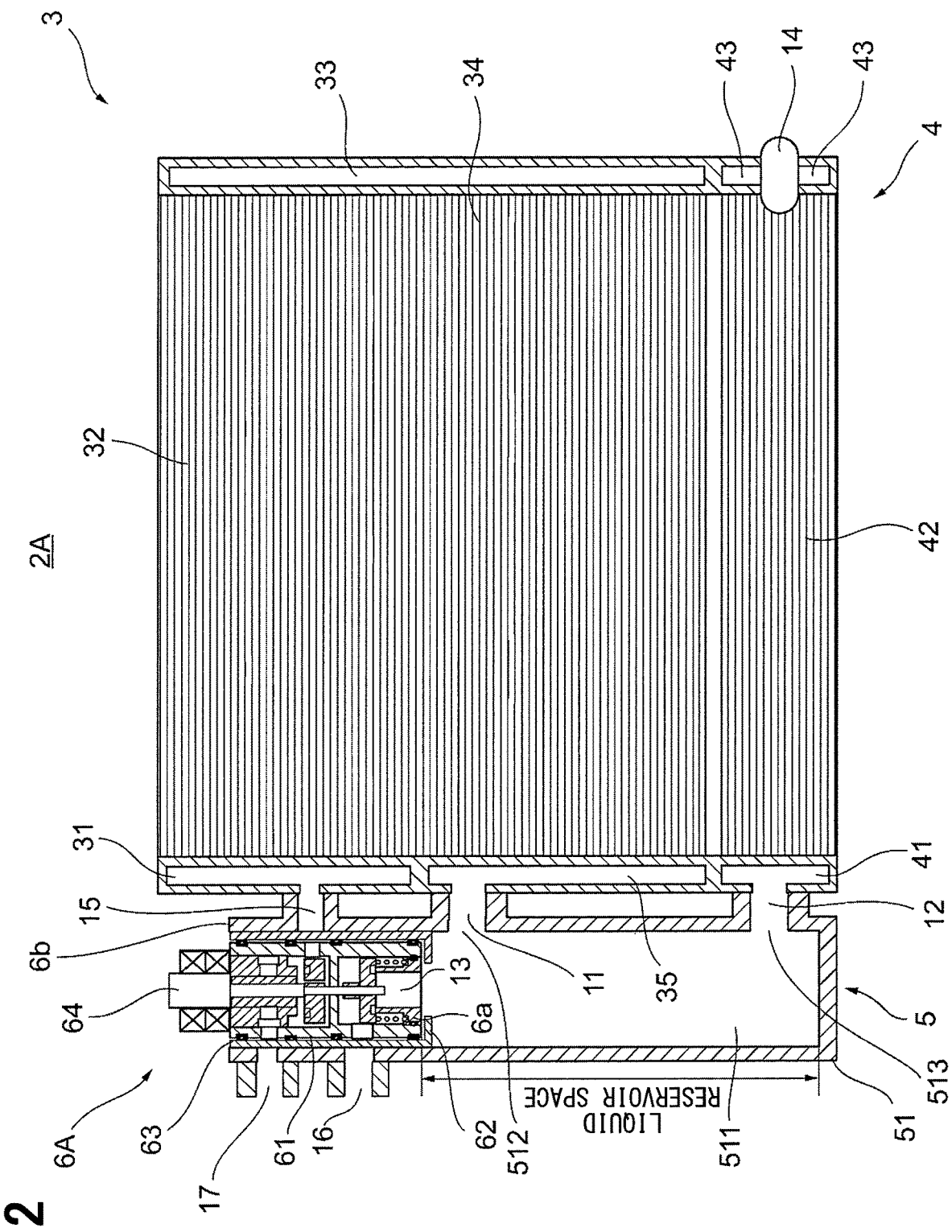
FIG. 2 is a view for explaining a heat exchanger according to a comparative example of FIG. 1.

As shown in FIG. 2, a heat exchanger 2A according to a modified example has an intermediate portion 62. The intermediate portion 62 is provided between the liquid reservoir 5 and the refrigerant adjustment portion 6. An inner surface of the intermediate portion 62 facing the refrigerant adjustment portion 6 has a surface accuracy enough to keep a close contact with the sealing portion 63.

Figure 3:
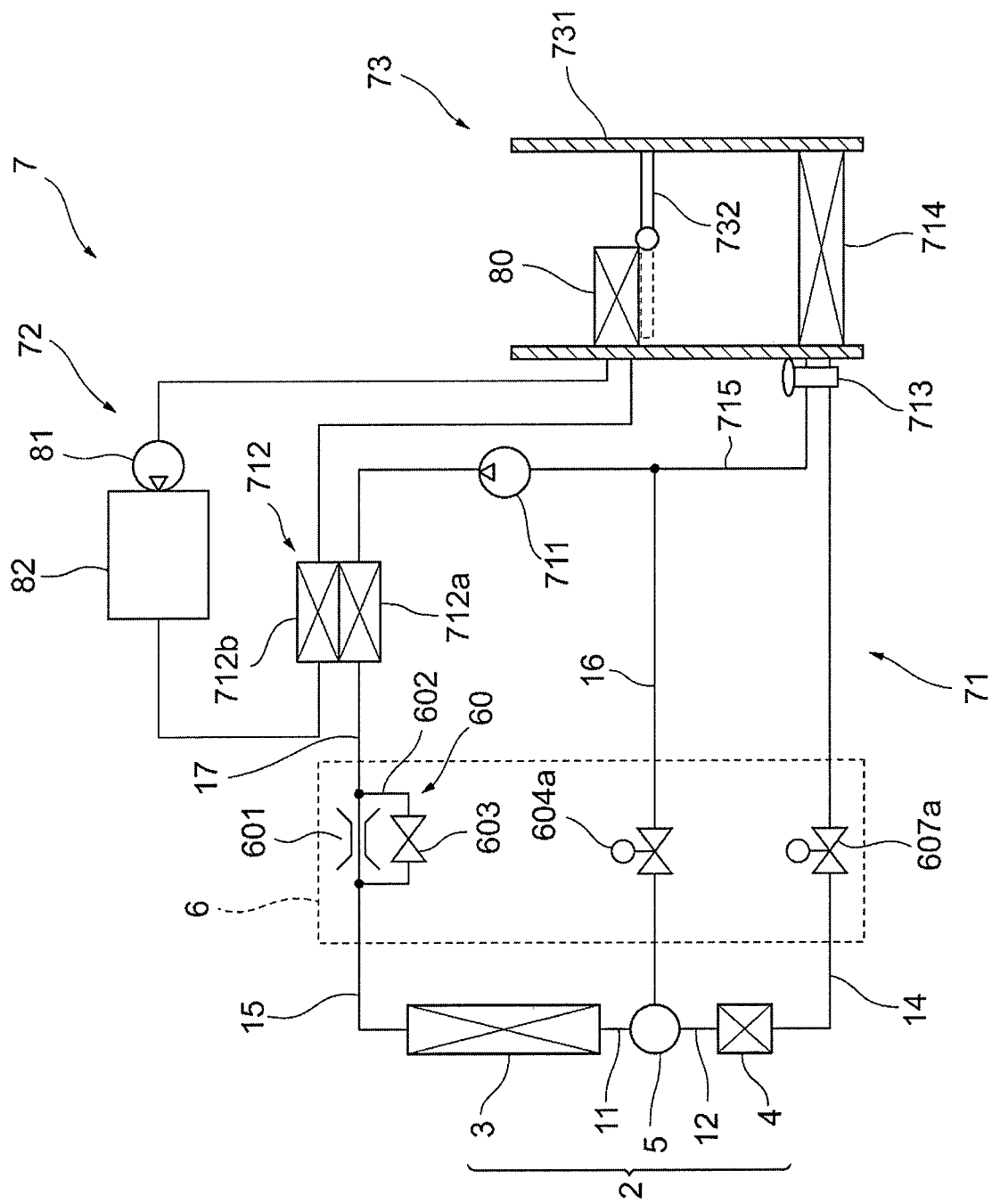
FIG. 3 is a view for explaining an example of a refrigeration cycle to which the heat exchanger according to the embodiment is applied.

An example of the refrigeration cycle to which the liquid reservoir 5 of the present embodiment is applied will be described with reference to FIG. 3. As shown in FIG. 3, the refrigeration cycle device 71 is applied to the vehicle air conditioner 7. The vehicle air conditioner 7 is a device that adjusts the temperature inside the vehicle compartment by adjusting the temperature of the air blown into the vehicle compartment which is the air-conditioning target space. The vehicle air conditioner 7 includes the refrigeration cycle device 71, a cooling water circuit 72, and an air-conditioning unit 73.

The refrigeration cycle device 71 is configured to selectively switch between a cooling mode for cooling the vehicle compartment by cooling the blown air and a heating mode for heating the vehicle compartment by heating the blown air. The refrigeration cycle device 71 is a compression type refrigeration cycle device constituted of a heat pump circuit in which the refrigerant circulates.

The refrigeration cycle device 71 includes a compressor 711, a water cooling condenser 712, a pressure regulator 60, a heat exchanger 2, a flow rate adjustment valve 607a, a flow rate adjustment valve 604a, a decompressor 713, and an evaporator 714. Here, HFC refrigerant or HFO refrigerant, for example, may be used as the refrigerant circulating in the refrigeration cycle device 71. Oil, i.e. refrigerating machine oil, for lubricating the compressor 711 is mixed in the refrigerant. Therefore, a part of the refrigerating machine oil circulates in the refrigeration cycle device 71 together with the refrigerant.

The compressor 711 draws the refrigerant through an intake port, compresses the refrigerant, and discharges the compressed refrigerant in a superheated state in the refrigeration cycle device 71. The compressor 711 is an electric compressor. The refrigerant discharged from a discharge port flows into the water cooling condenser 712.

The water cooling condenser 712 is a well-known water-refrigerant heat exchanger. The water cooling condenser 712 includes a first heat exchanging portion 712a and a second heat exchanging portion 712b.

The first heat exchanging portion 712a is located between the discharge port of the compressor 711 and the pressure regulator 60. That is, the refrigerant discharged from the compressor 711 flows through the first heat exchanging portion 712a.

The second heat exchanging portion 712b is provided in the middle of the cooling water circuit 72 through which the engine cooling water flows. In the cooling water circuit 72, the cooling water circulates by a cooling pump 81. The cooling water circulates, in order, the second heat exchanging portion 712b, the heater core 80, the cooling pump 81, and the engine 82.

The water cooling condenser 712 cools the refrigerant by performing a heat exchange between the refrigerant flowing through the first heat exchanging portion 712a and the cooling water flowing through the second heat exchanging portion 712b. The refrigerant flowing out of the first heat exchanging portion 712a flows to the pressure regulator 60.

In the cooling water circuit 72, the refrigerant heated by the engine 82 and the second heat exchanging portion 712b flows through the heater core 80, and thus the heater core 80 is heated. The heater core 80 is disposed in a casing 731 of the air-conditioning unit 73. The heater core 80 heats the blown air by exchanging heat between the cooling water flowing through the heater core 80 and the blown air flowing through the casing 731. The water cooling condenser 712 functions as a radiator that indirectly radiates heat of the refrigerant discharged from the compressor 711 and flowing into the first heat exchanging portion 712a to the blown air through the cooling water and the heater core 80.

The pressure regulator 60 includes a fixed throttle 601, a bypass passage 602, and an opening-closing valve 603. The pressure regulator 60 corresponds to a pressure regulation portion that adjusts a pressure of the refrigerant flowing into the upstream heat exchanging portion 3 so as to switch between the heating mode in which the refrigerant absorbs heat in the upstream heat exchanging portion 3 of the heat exchanger 2 from the outside air and the cooling mode in which the refrigerant releases heat to the outside air.

The fixed throttle 601 decompresses and discharges the refrigerant flowing out from the first heat exchanging portion 712a of the water cooling condenser 712. As the fixed throttle 601, a nozzle with fixed throttle opening, an orifice, or the like can be adopted. The refrigerant discharged from the fixed throttle 601 flows to the heat exchanger 2.

The bypass passage 602 is a refrigerant passage that guides the refrigerant flowing out from the first heat exchanging portion 712a to the heat exchanger 2 to bypass the fixed throttle 601. The opening-closing valve 603 is a solenoid valve that opens and closes the bypass passage 602.

The opening-closing valve 603 of the pressure regulator 60 is open in the heating mode. As a result, in the heating mode, the refrigerant flowing out of the first heat exchanging portion 712a of the water cooling condenser 712 flows through the fixed throttle 601, so that the refrigerant is decompressed and flows to the heat exchanger 2. In contrast, the opening-closing valve 603 is fully closed in the cooling mode. As a result, in the cooling mode, the refrigerant flowing out of the first heat exchanging portion 712a of the water cooling condenser 712 bypasses the fixed throttle 601 and flows through the bypass passage 602. That is, the refrigerant flowing out from the first heat exchanging portion 712a of the water cooling condenser 712 flows to the heat exchanger 2 without being compressed.

The heat exchanger 2 is an outdoor heat exchanger located on the vehicle front side in the engine room. The heat exchanger 2 includes the upstream heat exchanging portion 3, the liquid reservoir 5, and the downstream heat exchanging portion 4.

The refrigerant flowing out of the pressure regulator 60 flows into the upstream heat exchanging portion 3. The upstream heat exchanging portion 3 exchanges heat between the refrigerant flowing therein and the outside air that is the air outside the vehicle compartment blown by a blower fan (not shown). In the heating mode, the upstream heat exchanging portion 3 works as an evaporator that evaporates the refrigerant by performing a heat exchange between the refrigerant flowing therein and the outside air. In the cooling mode, the upstream heat exchanging portion 3 works as a condenser that cools the refrigerant by performing a heat exchange between the refrigerant flowing therein and the outside air.

The liquid reservoir 5 separates the refrigerant flowing out from the upstream heat exchanging portion 3 into a gas-phase refrigerant and a liquid-phase refrigerant, discharges the gas-phase refrigerant and the liquid-phase refrigerant separately, and stores the liquid-phase refrigerant. The liquid reservoir 5 discharges the separated gas-phase refrigerant toward a compressor-connected passage 16 and discharges the separated liquid-phase refrigerant toward the connection channel 12.

The compressor-connected passage 16 is connected to an intermediate portion of the refrigerant passage 715. The refrigerant passage 715 is a passage that guides the refrigerant flowing out from the decompressor 713 to the intake port of the compressor 711. The compressor-connected passage 16 is a passage that guides the gas-phase refrigerant discharged from the liquid reservoir 5 to the compressor 711.

The liquid-phase refrigerant discharged from the liquid-phase refrigerant outlet of the liquid reservoir 5 flows into the downstream heat exchanging portion 4. The downstream heat exchanging portion 4 further improves the heat exchange efficiency of the refrigerant in the heat exchanger 2 by exchanging heat between the incoming liquid-phase refrigerant and the outside air. Specifically, the downstream heat exchanging portion 4 evaporates, in the heating mode, the liquid-phase refrigerant by exchanging heat between the liquid-phase refrigerant flowing therein and the outside air. As a result, since the liquid-phase refrigerant remaining without being evaporated in the upstream heat exchanging portion 3 can be evaporated, the function as the evaporator in the heat exchanger 2 is improved. However, since the number of tubes is small and the refrigerant passage area is small due to the small installation space, the downstream heat exchanging portion 4 may be operated without flowing the refrigerant in order to avoid an increase in refrigerant pressure loss. In the cooling mode, the downstream heat exchanging portion 4 works as a subcooler that further cools the liquid-phase refrigerant by performing a heat exchange between the refrigerant flowing therein and the outside air. As a result, the function of the heat exchanger 2 as a condenser is improved.

The downstream heat exchanging portion 4 is connected to the flow rate adjustment valve 607a through the outflow channel 14. The refrigerant flowing out from the downstream heat exchanging portion 4 flows into the flow rate adjustment valve 607a via the outflow channel 14.

The flow rate adjustment valve 607a is connected to the decompressor 713 through the outflow channel 14. The flow rate adjustment valve 607a adjusts the volume of the refrigerant flowing therein from the downstream heat exchanging portion 4 through the outflow channel 14 into the decompressor 713. The refrigerant can be regulated so as not to flow into the decompressor 713 by closing the flow rate adjustment valve 607a.

The refrigerant flowing out from the downstream heat exchanging portion 4 flows into the decompressor 713 through the outflow channel 14. The decompressor 713 decompresses the incoming refrigerant and then discharges the refrigerant. The refrigerant decompressed by the decompressor 713 flows into the evaporator 714. In addition, the refrigerant discharged from the evaporator 714 flows into the decompressor 713. The decompressor 713 is a thermosensitive mechanical expansion valve that decompresses and expands the refrigerant flowing into the evaporator 714 such that the degree of superheating of the refrigerant discharged from the evaporator 714 falls within a predetermined range.

The refrigerant discharged from the decompressor 713 flows into the evaporator 714. The evaporator 714 is a heat exchanger that cools the blown air by exchanging heat between the refrigerant flowing therein and the blowing air flowing through the casing 731 of the air-conditioning unit 73 in the cooling mode. In the evaporator 714, heat exchange is performed between the blown air and the refrigerant, whereby the refrigerant is evaporated. The evaporated refrigerant is discharged from the evaporator 714 and flows into the intake port of the compressor 711 via the decompressor 713 and the refrigerant passage 715.

The flow rate adjustment valve 604a is provided in the middle of the compressor-connected passage 16. The flow rate adjustment valve 604a is an electromagnetic valve configured to change a cross-sectional area of the compressor-connected passage 16 by adjusting its opening degree. The flow rate of the refrigerant flowing through the compressor-connected passage 16 can be adjusted by adjusting the opening degree of the flow rate adjustment valve 604a.

In the refrigeration cycle device 71, the pressure regulator 60, the flow rate adjustment valve 607a, and the flow rate adjustment valve 604a are integrated as a single actuator device, i.e. the refrigerant adjustment portion 6.

The air-conditioning unit 73 includes the casing 731 and an air passage switching door 732. The blown air flows through the casing 731. The evaporator 714 and the heater core 80 are arranged in the casing 731 in order from the upstream side to the downstream side of the blown air. The evaporator 714 cools the blown air by exchanging heat between the refrigerant flowing therein and the blown air. A warm-air passage in which the heater core 80 is provided and a cold-air passage in which the heater core 80 is not provided are located downstream of the evaporator 714 in the casing 731.

The air passage switching door 732 is configured to switch its position between a first door position illustrated with a solid line at which the cold air passage is closed and the warm air passage is opened and a second door position illustrated with a dashed line at which the warm air passage is closed and the cold air passage is opened. Multiple opening portions (not shown) that are open in the vehicle compartment are located downstream of the warm air passage and the cold air passage in the casing 731.

In the air-conditioning unit 73, the air passage switching door 732 is positioned at the first door position illustrated with the solid line in the heating mode. As a result, since the blown air passing through the evaporator 714 flows through the warm air passage, the blown air is heated by the heater core 80 and flows to the downstream side. On the other hand, the air passage switching door 732 is positioned at the second door position illustrated with the dashed line in the cooling mode. Thus, since the blown air passing through the evaporator 714 flows through the cold air passage, the blown air cooled by the evaporator 714 flows directly to the downstream side.

Figure 4:
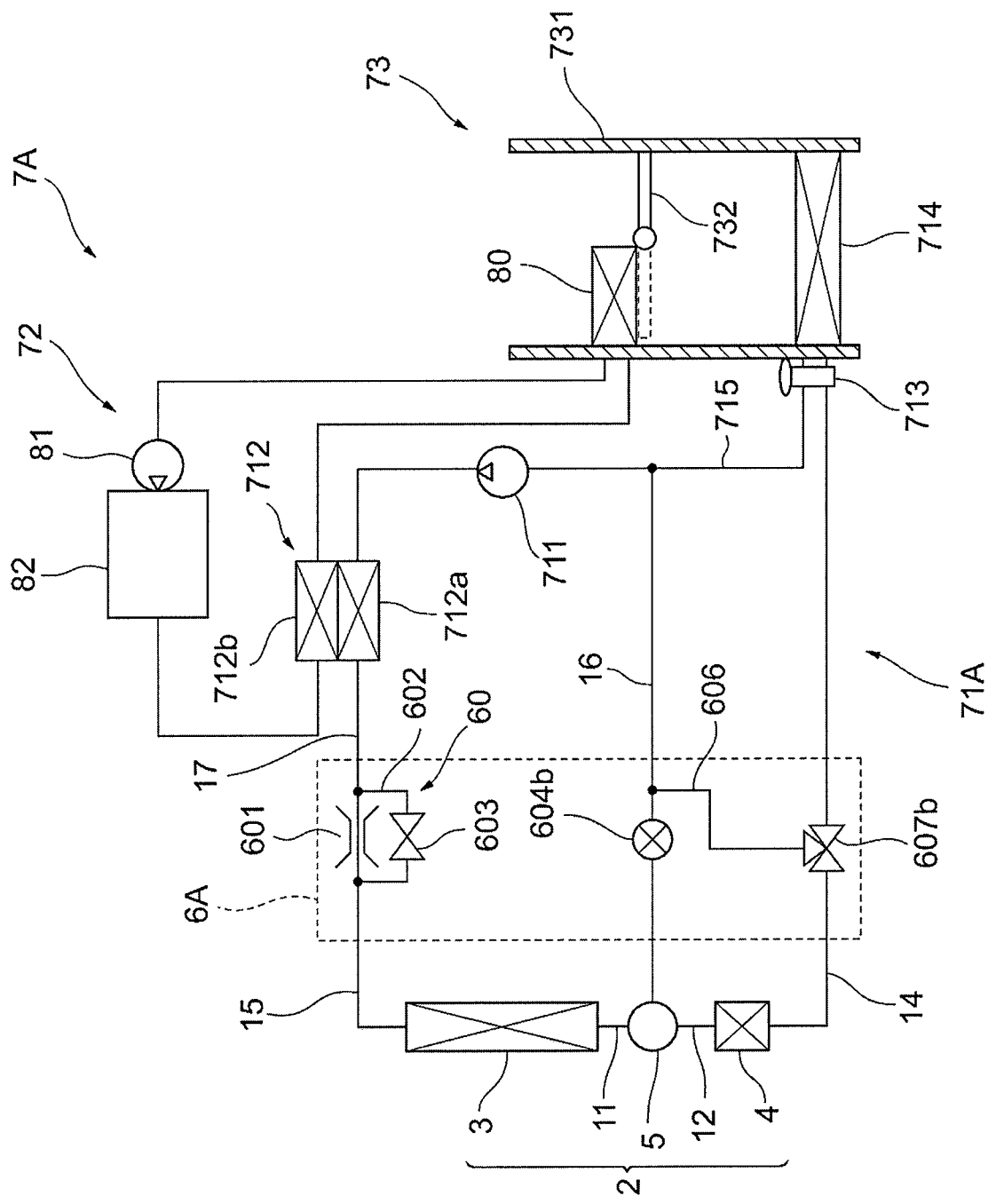
FIG. 4 is a view for explaining an example of a refrigeration cycle to which the heat exchanger according to the embodiment is applied.

Another example of the refrigeration cycle to which the liquid reservoir 5 of the present embodiment is applied will be described with reference to FIG. 4. As shown in FIG. 4, the refrigeration cycle device 71A is applied to the vehicle air conditioner 7A. The vehicle air conditioner 7A includes the refrigeration cycle device 71A, a cooling water circuit 72, and an air-conditioning unit 73. The cooling water circuit 72 and the air-conditioning unit 73 are the same as those of the vehicle air conditioner 7, so the description thereof will be omitted.

The refrigeration cycle device 71A includes a refrigerant adjustment portion 6A in place of the refrigerant adjustment portion 6 of the refrigeration cycle device 71.

The refrigeration cycle device 71A includes a compressor 711, a water cooling condenser 712, a pressure regulator 60, a heat exchanger 2, a three-way valve 607b, a flow rate adjustment valve 604b, a decompressor 713, and an evaporator 714.

The compressor-connected passage 16 is connected to an intermediate portion of the refrigerant passage 715. The refrigerant passage 715 is a passage for guiding the refrigerant flowing out from the decompressor 713 to the intake port of the compressor 711. The compressor-connected passage 16 is a passage that bypasses the three-way valve 607b and the decompressor 713 and guides the gas-phase refrigerant discharged from the liquid reservoir 5 to the compressor 711.

The downstream heat exchanging portion 4 is connected to the three-way valve 607b through the outflow channel 14. The refrigerant flowing out from the downstream heat exchanging portion 4 flows into the three-way valve 607b via the outflow channel 14.

The three-way valve 607b is connected to the decompressor 713 via the outflow channel 14 and connected to a part of the compressor-connected passage 16 via the bypass passage 606. The three-way valve 607b selectively switches to which of the decompressor 713 and the bypass passage 606 the refrigerant flowing from the downstream heat exchanging portion 4 through the outflow channel 14 flows.

The flow rate adjustment valve 604b is provided in the middle of the compressor-connected passage 16. The flow rate adjustment valve 604b is located upstream of a connection portion between the compressor-connected passage 16 and the bypass passage 606. The flow rate adjustment valve 604b is an electromagnetic valve configured to change a cross-sectional area of the compressor-connected passage 16 by adjusting its opening degree. The flow rate of the refrigerant flowing through the compressor-connected passage 16 can be adjusted by adjusting the opening degree of the flow rate adjustment valve 604b.

In the refrigeration cycle device 71, the pressure regulator 60, the three-way valve 607b, and the flow rate adjustment valve 604b are integrated as a single actuator device, i.e. the refrigerant adjustment portion 6.

Figure 5:
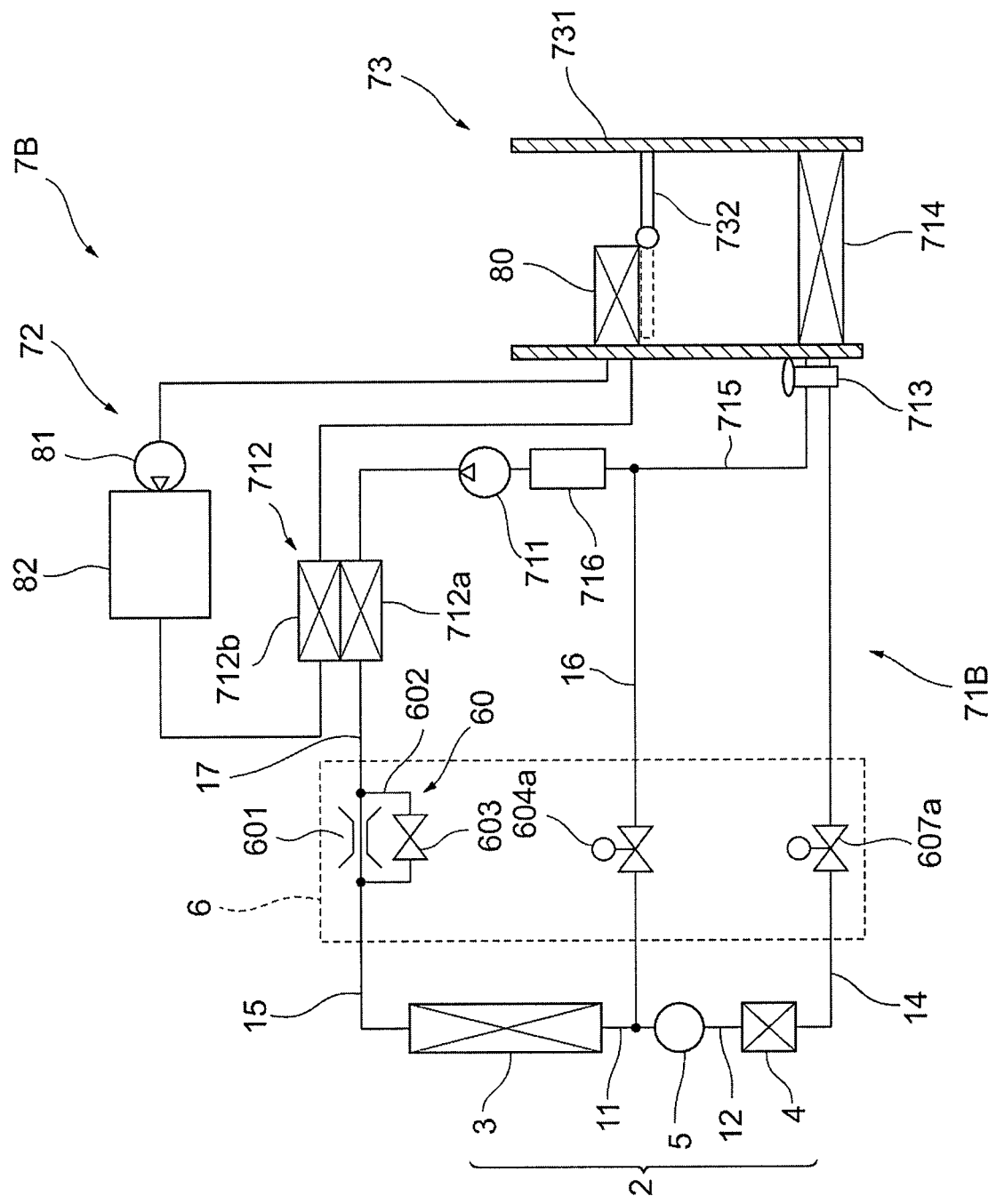
FIG. 5 is a view for explaining an example of a refrigeration cycle to which the heat exchanger according to the embodiment is applied.

Another example of the refrigeration cycle to which the liquid reservoir 5 of the present embodiment is applied will be described with reference to FIG. 5. As shown in FIG. 5, the refrigeration cycle device 71B is applied to the vehicle air conditioner 7B. The vehicle air conditioner 7B includes the refrigeration cycle device 71B, a cooling water circuit 72, and an air-conditioning unit 73. The cooling water circuit 72 and the air-conditioning unit 73 are the same as those of the vehicle air conditioner 7, so the description thereof will be omitted.

In the refrigeration cycle device 71B, an accumulator 716 is located upstream of the compressor 711 in the refrigerant passage 715. The accumulator 716 may be provided as a second liquid reserving device in addition to the liquid reservoir 5 as described above.

Figure 6:
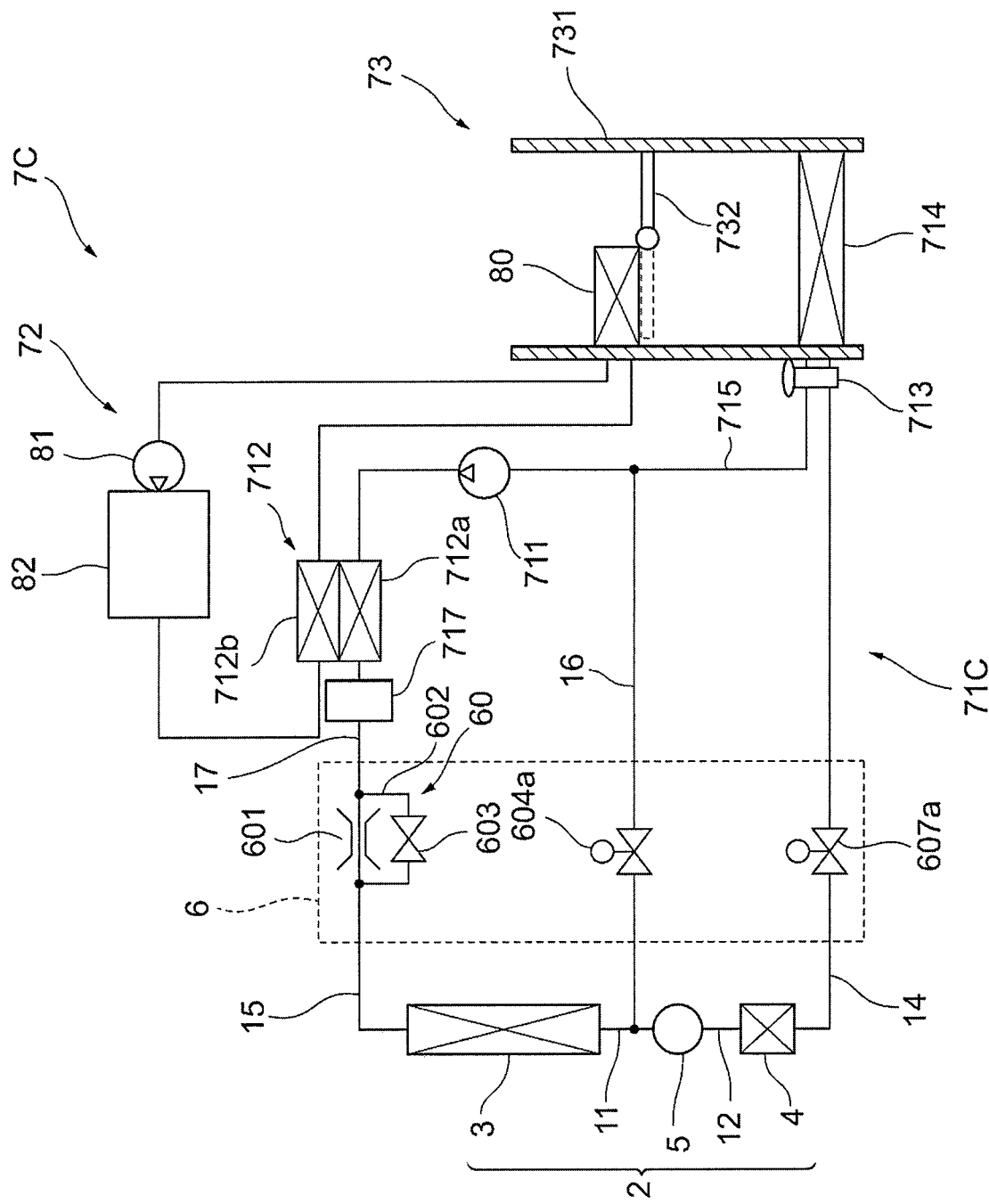
FIG. 6 is a view for explaining an example of a refrigeration cycle to which the heat exchanger according to the embodiment is applied.

Another example of the refrigeration cycle to which the liquid reservoir 5 of the present embodiment is applied will be described with reference to FIG. 6. As shown in FIG. 6, the refrigeration cycle device 71C is applied to the vehicle air conditioner 7C. The vehicle air conditioner 7C includes the refrigeration cycle device 71C, a cooling water circuit 72, and an air-conditioning unit 73. The cooling water circuit 72 and the air-conditioning unit 73 are the same as those of the vehicle air conditioner 7, so the description thereof will be omitted.

A receiver 717 is located downstream of the water cooling condenser 712 in the refrigeration cycle device 71C. The receiver 717 may be provided as a second liquid reserving device in addition to the liquid reservoir 5 as described above.

Figure 7:
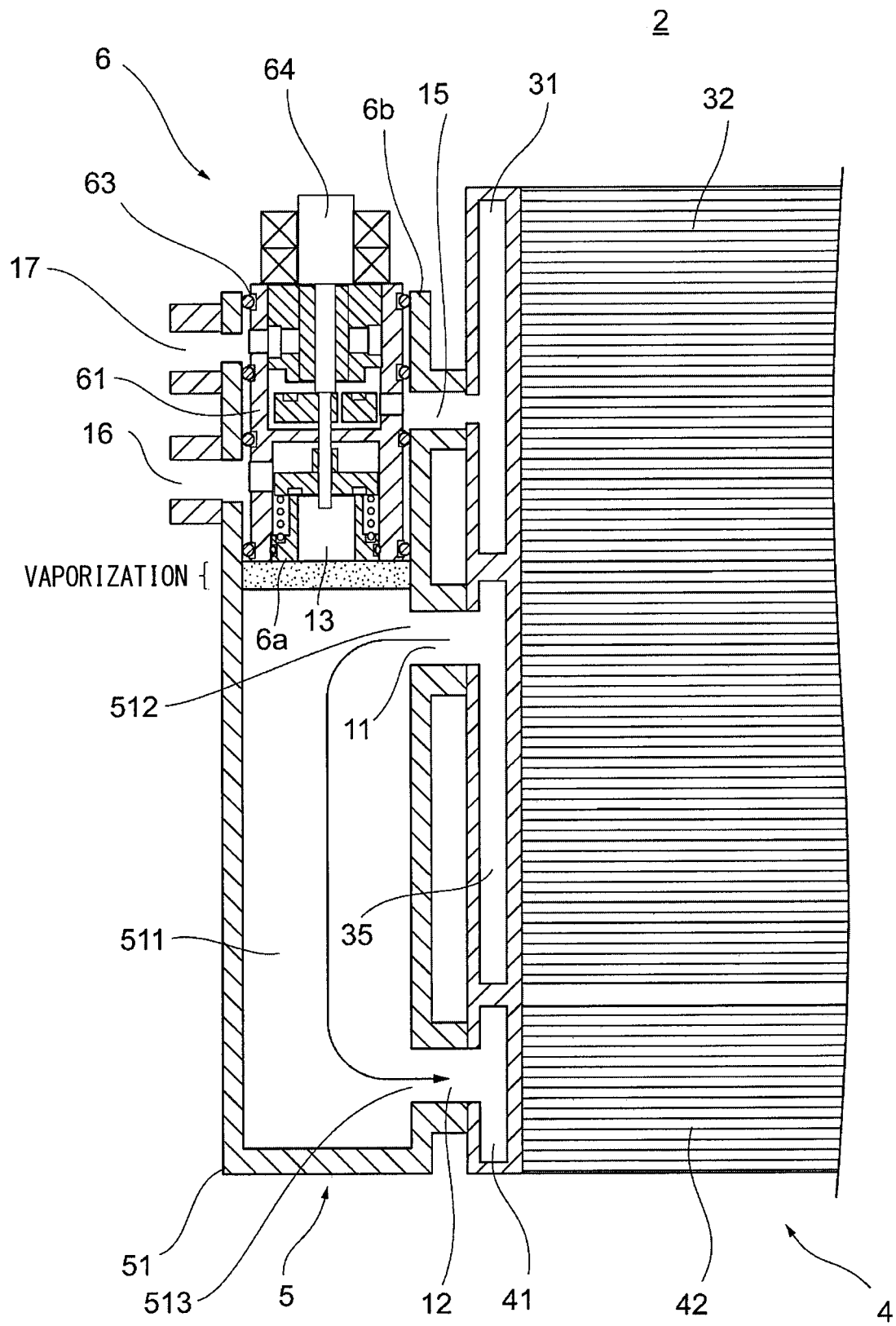
FIG. 7 is a diagram for explaining a reduction in an influence of vaporization due to thermal damage.

Subsequently, with reference to FIG. 7, description will be continued on the liquid reservoir 5 and the refrigerant adjustment portion 6. As shown in FIG. 7, the inflow channel 17 is provided in the refrigerant adjustment portion 6. The inflow channel 17 extends from the refrigerant passage constituting the refrigeration cycle toward the upstream heat exchanging portion 3, and the hot refrigerant flows into the inflow channel 17. Accordingly, since the refrigerant adjustment portion 6 becomes high temperature, the refrigerant stored in the liquid reservoir space 511 may be gasified, and the actual capacity of the liquid reservoir 5 may decrease.

The connection channel 11 is connected to the inflow port 512 facing the liquid reservoir space 511 as shown in FIG. 7. The inflow port 512 is located close to the inflow channel 17. Specifically, the liquid reservoir space 511 for storing the refrigerant extends in the liquid reservoir 5 from one end close to the inflow channel 17 to the other end farther from the inflow channel 17 in a longitudinal direction. The connection channel 11 through which the refrigerant flows from the upstream heat exchanging portion 3 into the liquid reservoir 5 is connected to the inflow port 512 closer to the one end than to the other end. Accordingly, the space in which the refrigerant may be vaporized can be reduced, and the actual capacity of the liquid reservoir 5 can be secured.

Figure 8:
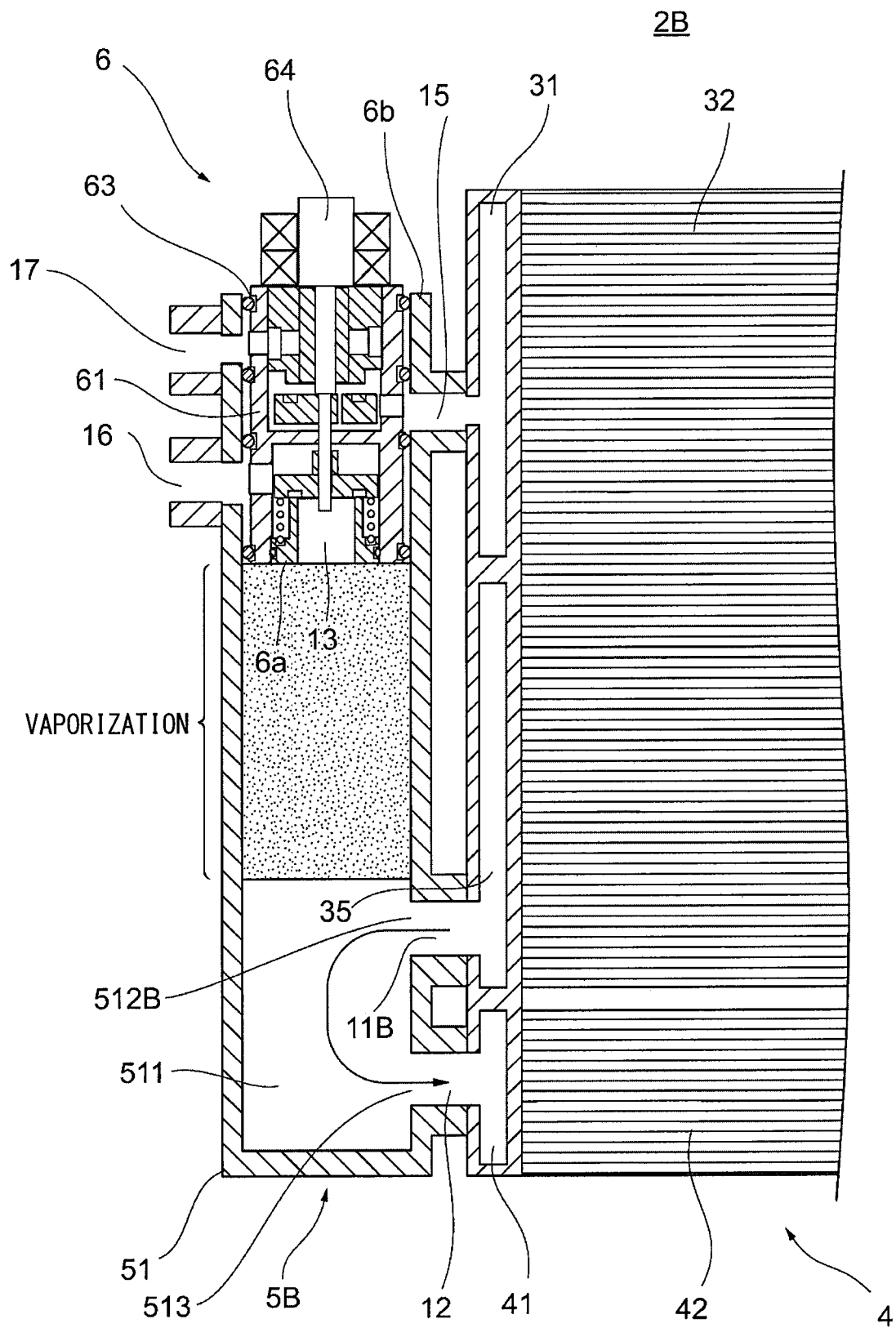
FIG. 8 is a diagram for explaining a reduction in an influence of vaporization due to thermal damage.

As a comparative example, FIG. 8 shows a heat exchanger 2B having a liquid reservoir 5B. The inflow port 512B is formed at a position close to the other end farther from the inflow channel 17, and the connection channel 11B is connected to the inflow port 512B. According to such configuration, a space between the inflow port 512B and the refrigerant adjustment portion 6 is the gasified space, and the actual capacity of the liquid reservoir 5 may decrease.

Figure 9:
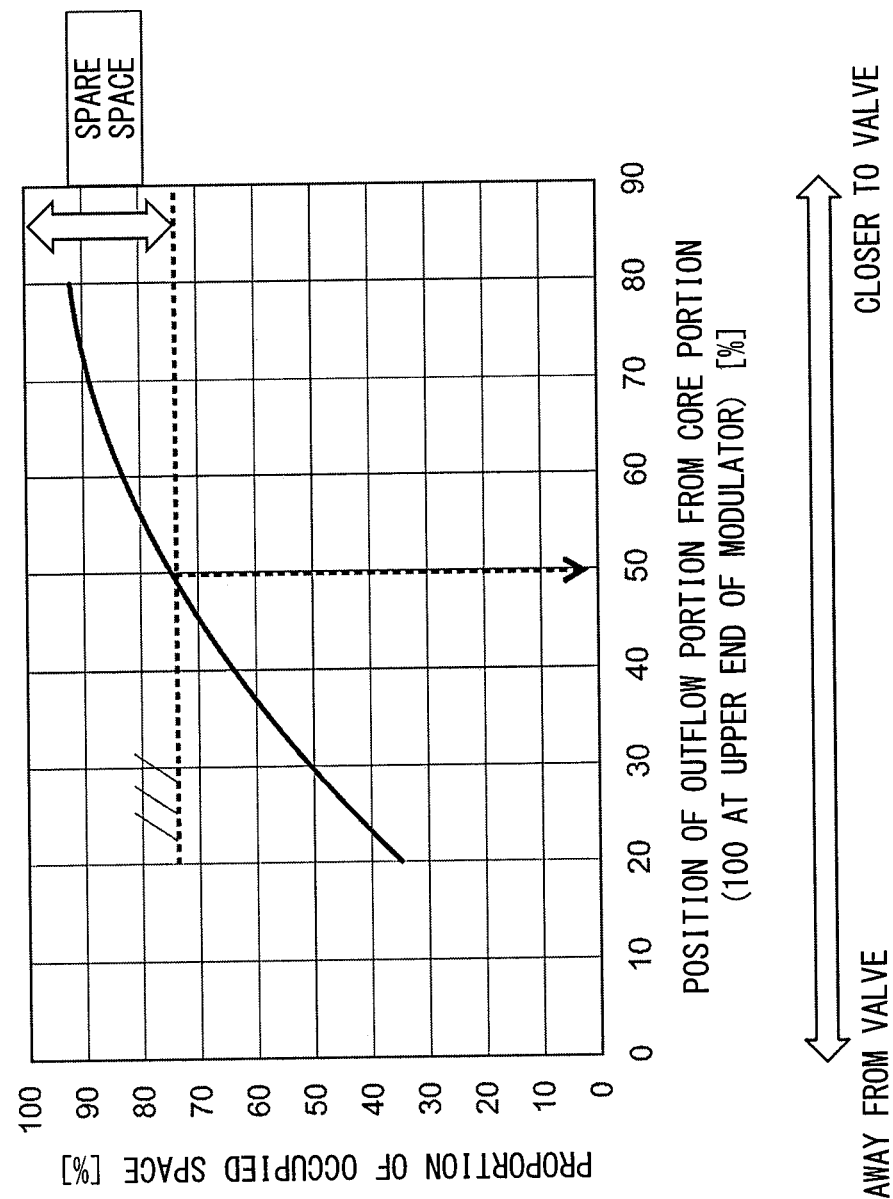
FIG. 9 is a view for explaining a position of an inflow port from a core portion.

The connection position to which the inflow port 512 is connected is preferably higher than the middle position between the upper end and the lower end of the liquid reservoir 5. As shown in FIG. 9, in consideration of the proportion of occupied space, it is preferable that the connection position of the inflow port 512 is higher. The height of the liquid reservoir 5 is set by stack up "leakage with age", "absorption of load fluctuation", "spare space" on top of each other. "Leakage with age" refers to an expected amount of refrigerant that leaks from various parts over a number of years of use when the heat exchanger 2 is used for the refrigeration cycle. "Absorption of load fluctuation" is an expected amount of fluctuation in the amount of liquid-phase refrigerant that flows in during the operation of the refrigeration cycle. Since the combined height of "leakage over years" and "load fluctuation buffer" is liquid surface height required in the design of the liquid reservoir 5, the inflow port 512 is preferably provided above this height. Since the spare space requires 25% of the proportion of occupied space, the connection position of the inflow port 512 is preferably higher than the middle position between the upper end and the lower end of the liquid reservoir 5 as shown in FIG. 9.

The void space 65 is provided in the liquid reservoir 5 in order to prevent the thermal damage. The void space 65 is formed by interposing a sealing portion 63 which is a cushioning component between the refrigerant adjustment portion 6 and the liquid reservoir 5. Although the void space 65 is provided between the refrigerant adjustment portion 6 and the liquid reserving portion 51 in the present embodiment, the void space is not necessarily provided directly on the liquid reservoir 5. The void space 65 may be provided between the refrigerant adjustment portion 6 and the intermediate portion 62 as shown in FIG. 2. In the present embodiment, the void spaces 65, 65C are provided between the inflow channel 17 and the liquid reservoir space 511. The void spaces 65, 65C separates the refrigerant adjustment portion 6 from another component such as the liquid reserving portion 51 and the intermediate portion 62.

Figure 10:
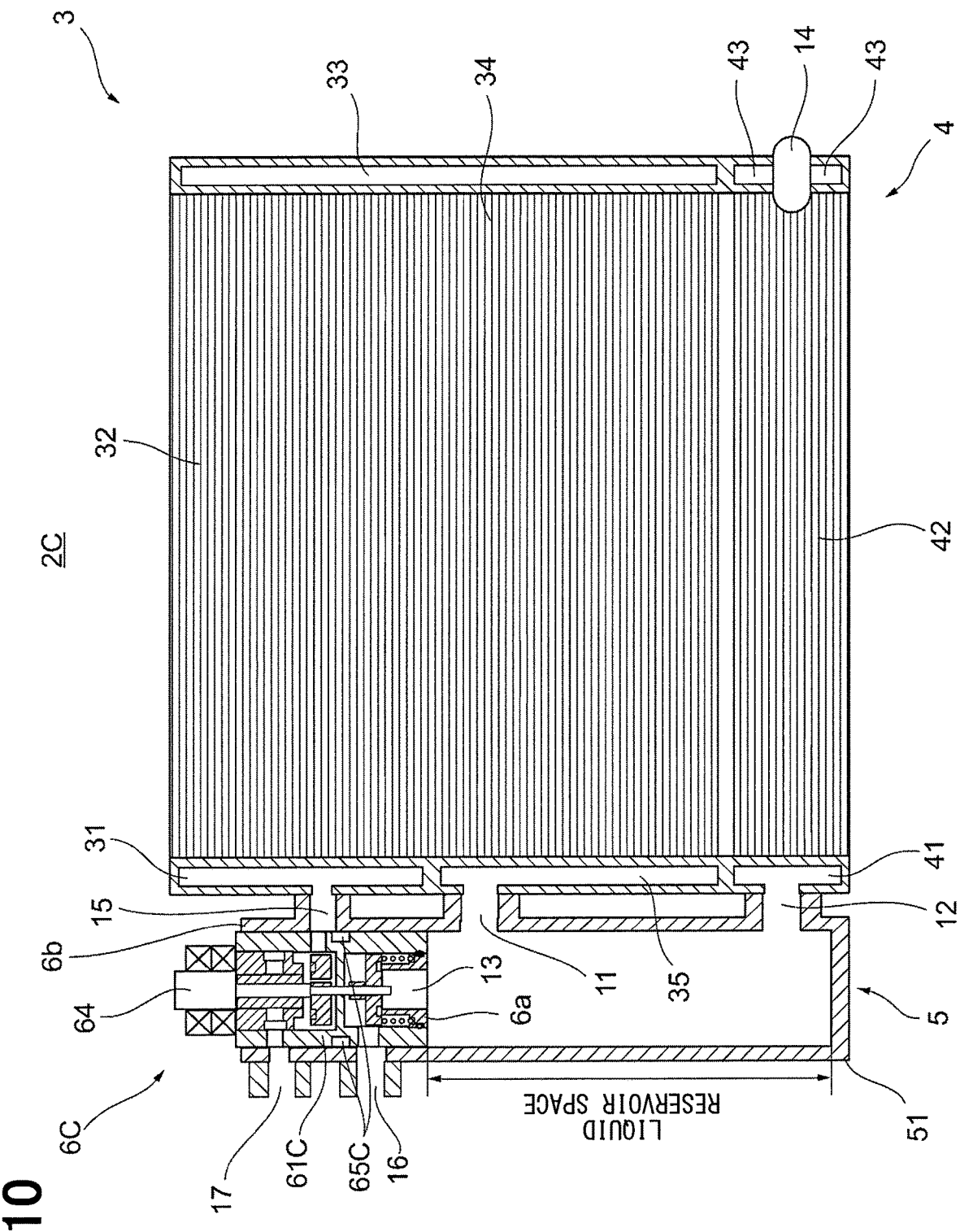
FIG. 10 is a view for explaining a void space.
Figure 20:
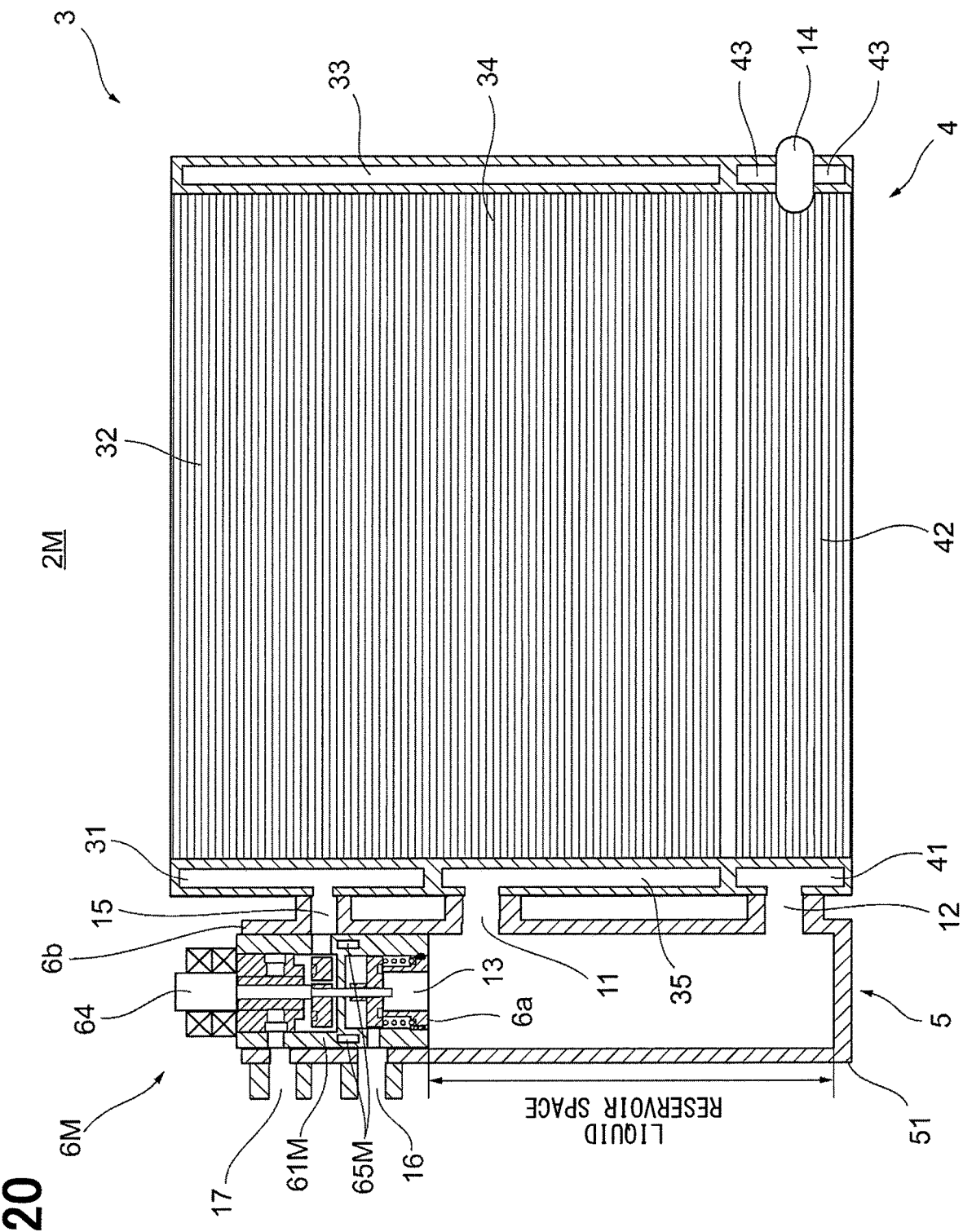
FIG. 20 is a view for explaining a void space.

In a heat exchanger 2C shown in FIG. 10, a void space 65C is provided without the sealing portion 63. A part of a body portion 61C is recessed to form the void space 65C. In a heat exchanger 2M shown in FIG. 20, a void space 65M is provided inside a body portion 61M constituting a refrigerant adjustment portion 6M. In the refrigerant adjustment portion 6M, the void space 65M is provided between the inflow channel 17 and the liquid reservoir space 511.

Figure 11:
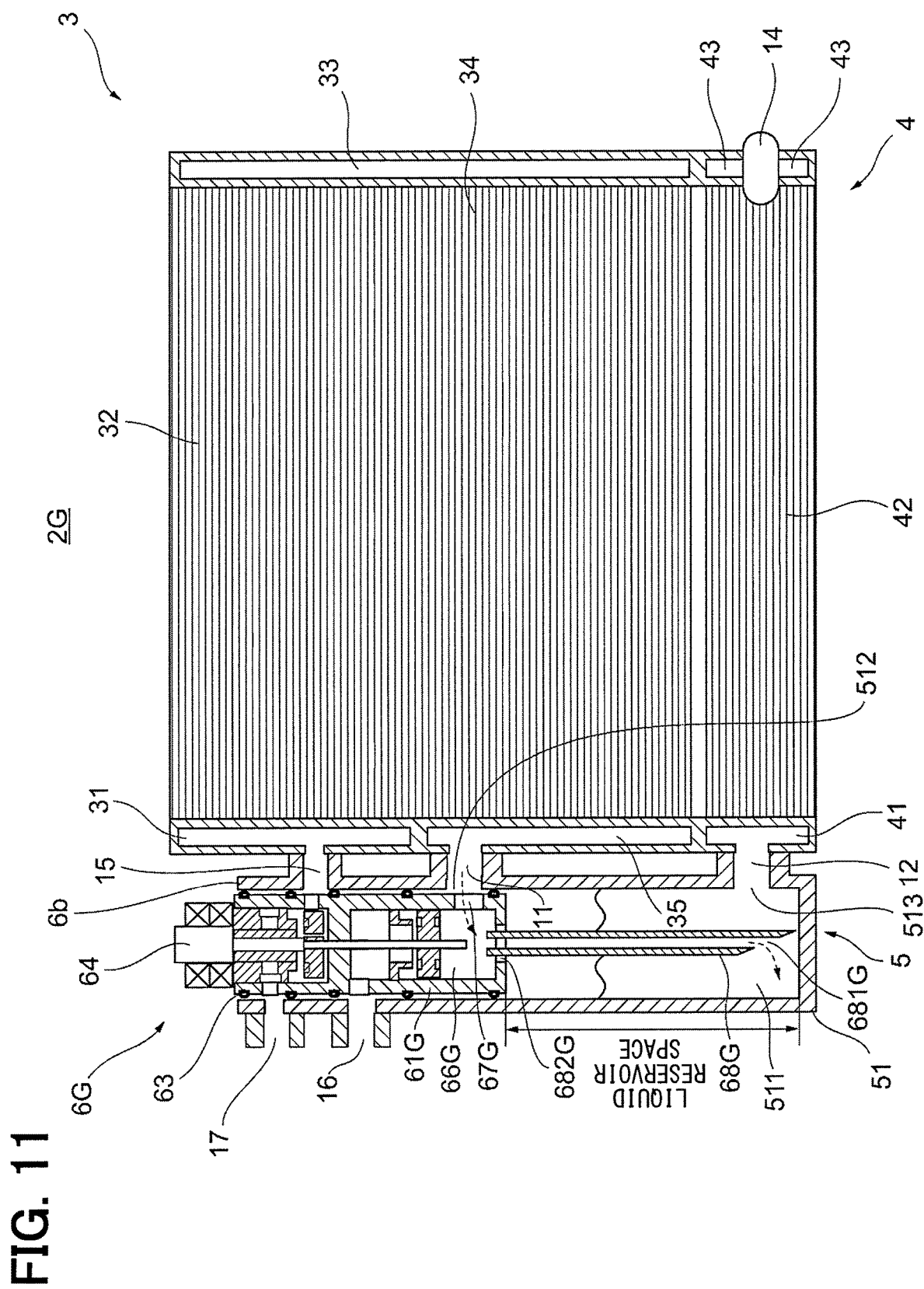
FIG. 11 is a diagram for explaining an example in which a pipe of a refrigerant is provided.

A heat exchanger 2G designed to avoid the disturbance of the liquid surface will be described with reference to FIG. 11. The heat exchanger 2G includes a liquid reservoir 5G and a refrigerant adjustment portion 6G. A buffer space 66G is defined in the refrigerant adjustment portion 6G.

The buffer space 66G is located above an outflow channel 682G. A communication hole 67G is provided such that the refrigerant from the inflow port 512 flows into the buffer space 66G. The communication hole 67G is provided at a part of the body portion 61G facing the inflow port 512.

A pipe 68G is connected to an outflow channel 682G. The pipe 68G extends so as to guide the refrigerant to a part which is at least lower than the liquid surface of the refrigerant stored in the liquid reservoir space 511. In the present embodiment, a lower end of the pipe 68G is located below the outflow port 513. A refrigerant outlet 681G is formed at the lower end of the pipe 68G.

The refrigerant flowing through the inflow port 512 flows into the buffer space 66G. The refrigerant temporarily stored in the buffer space 66G flows from the outflow channel 682G to the refrigerant outlet 681G through the pipe 68G, and flows into the liquid reservoir space 511. Since the refrigerant is guided below the liquid surface, the liquid surface disturbance can be suppressed. Further, since the refrigerant outlet 681G is open on the side opposite from the outflow port 513, flowing out of the refrigerant containing gas from the outflow port 513 can be suppressed. A valve (not shown) or a differential pressure regulating valve (not shown) is provided for regulating the volume of the refrigerant supplied to the downstream heat exchanging portion 4 in the heating operation.

Figure 12:
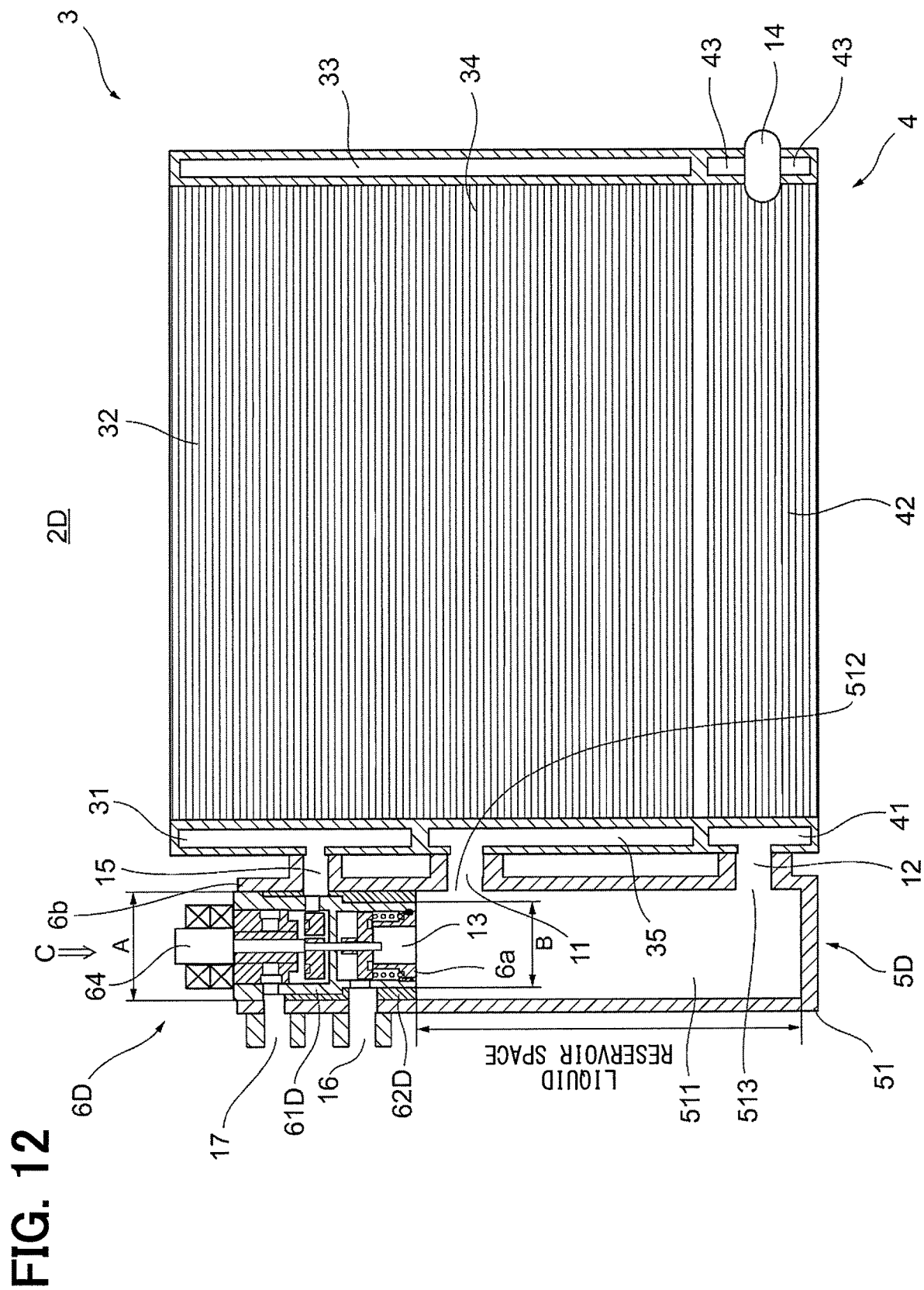
FIG. 12 is a view for explaining an example of a refrigerant adjustment portion.
Figure 13:
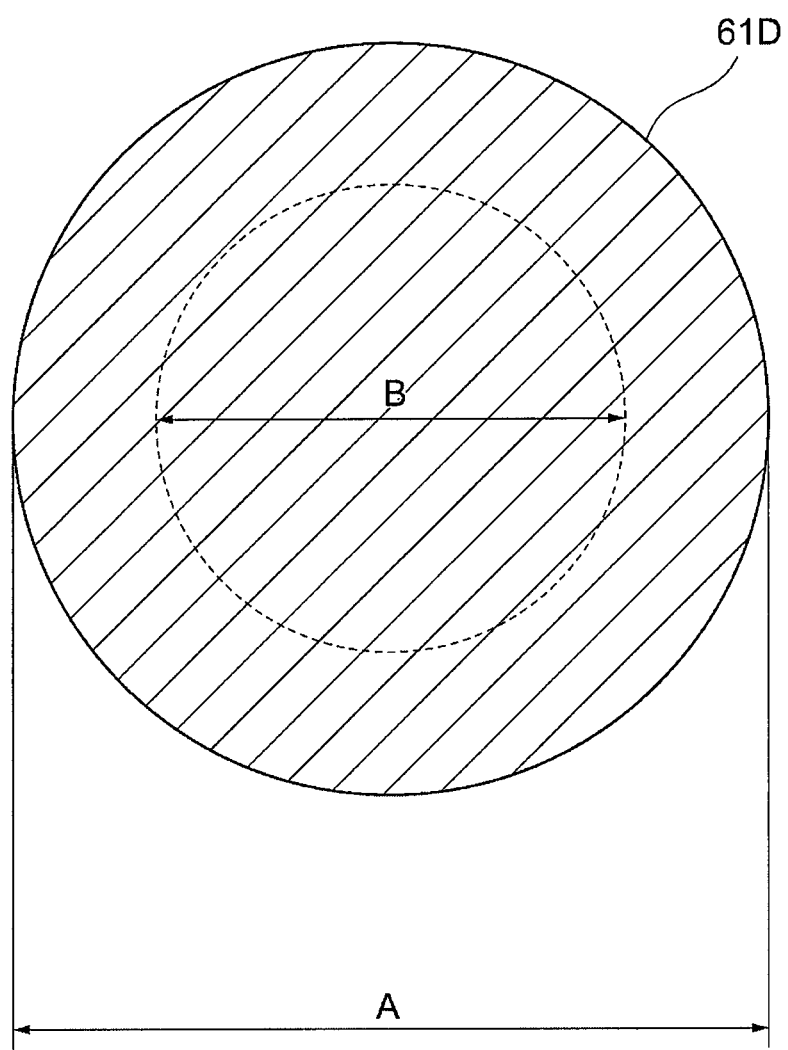
FIG. 13 is a diagram viewed in a direction C of FIG. 12.

The heat exchanger 2D shown in FIG. 12 includes a liquid reservoir 5D and a refrigerant adjustment portion 6D. The refrigerant adjustment portion 6D includes a body portion 61D configured to be easily inserted into the liquid reservoir 5D. The intermediate portion 62D is provided between the body portion 61F and the liquid reserving portion 51. As shown in FIG. 13, a projected area B of an inserted end portion 6a inserted into the liquid reservoir 5D is smaller than a projected area A of an exposed end portion 6b projected on a plane.

Since at least a part of the refrigerant adjustment portion 6 is inserted into the liquid reservoir 5, the liquid reservoir 5 can be used for protecting from water. In addition, connection between the refrigerant adjustment portion 6 and various flow paths is also easy by using the liquid reservoir 5.

Figure 14:
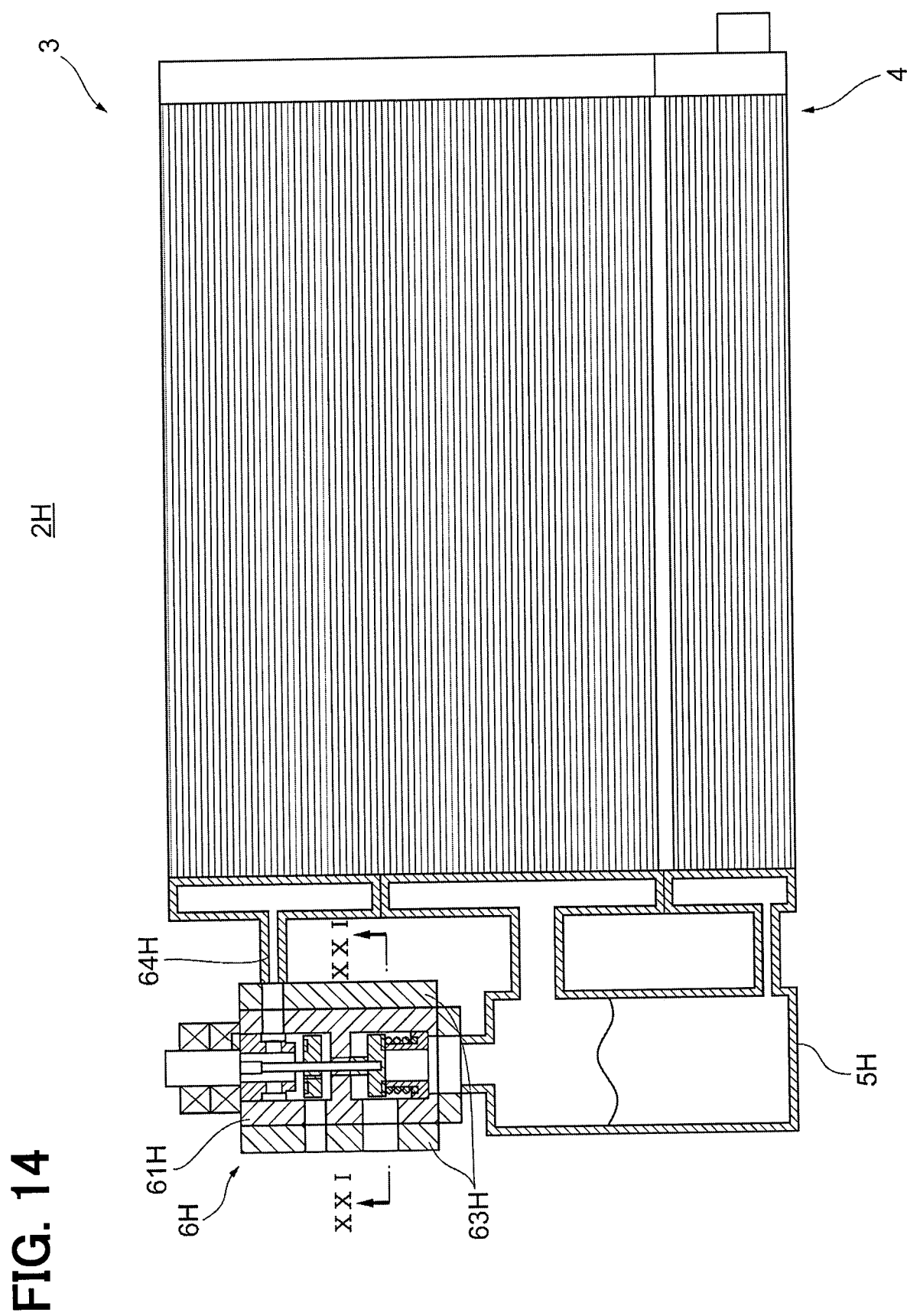
FIG. 14 is a view for explaining a heat exchanger according to a comparative example.
Figure 15:
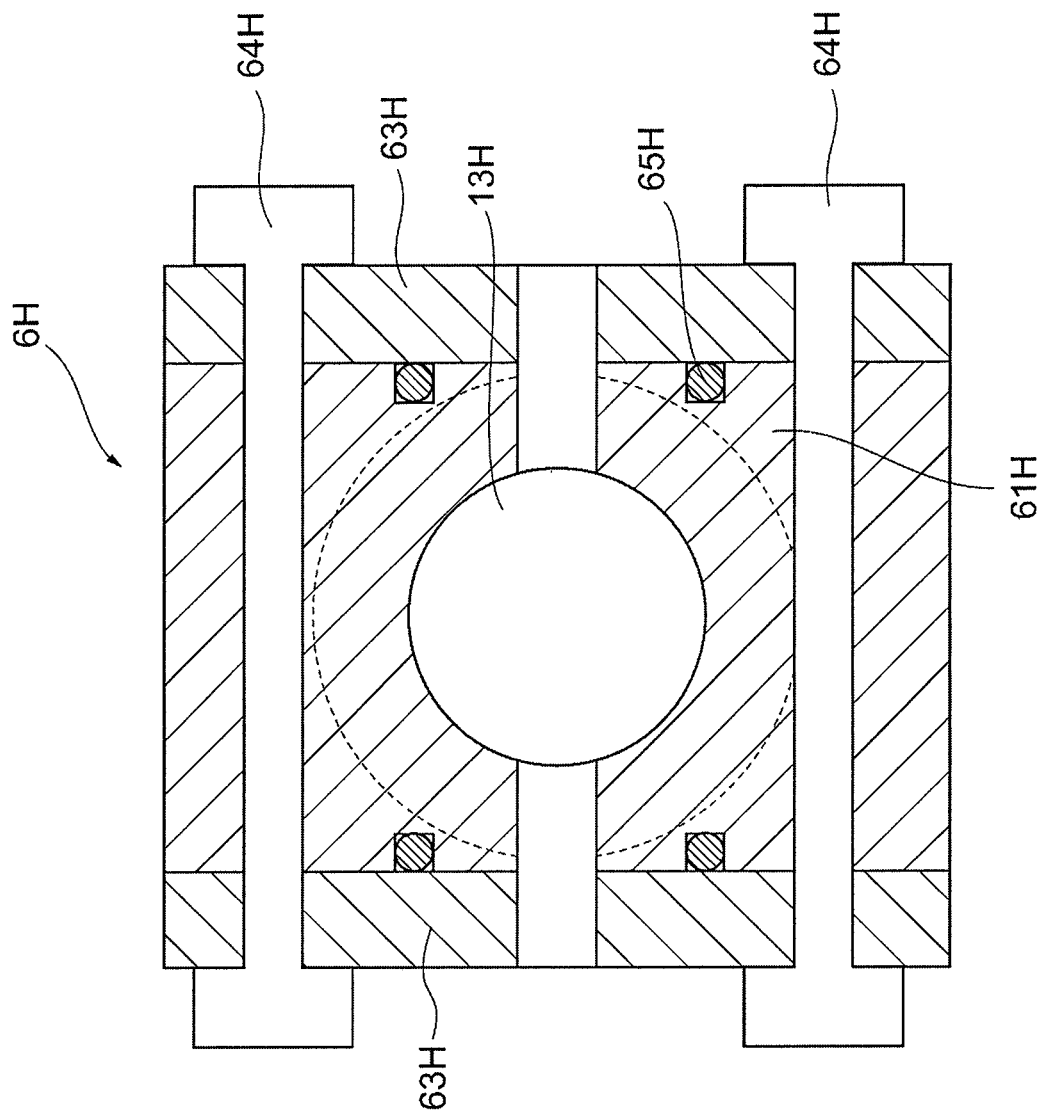
FIG. 15 is a cross-sectional view taken along line XXI-XXI of FIG. 14.
Figure 16:
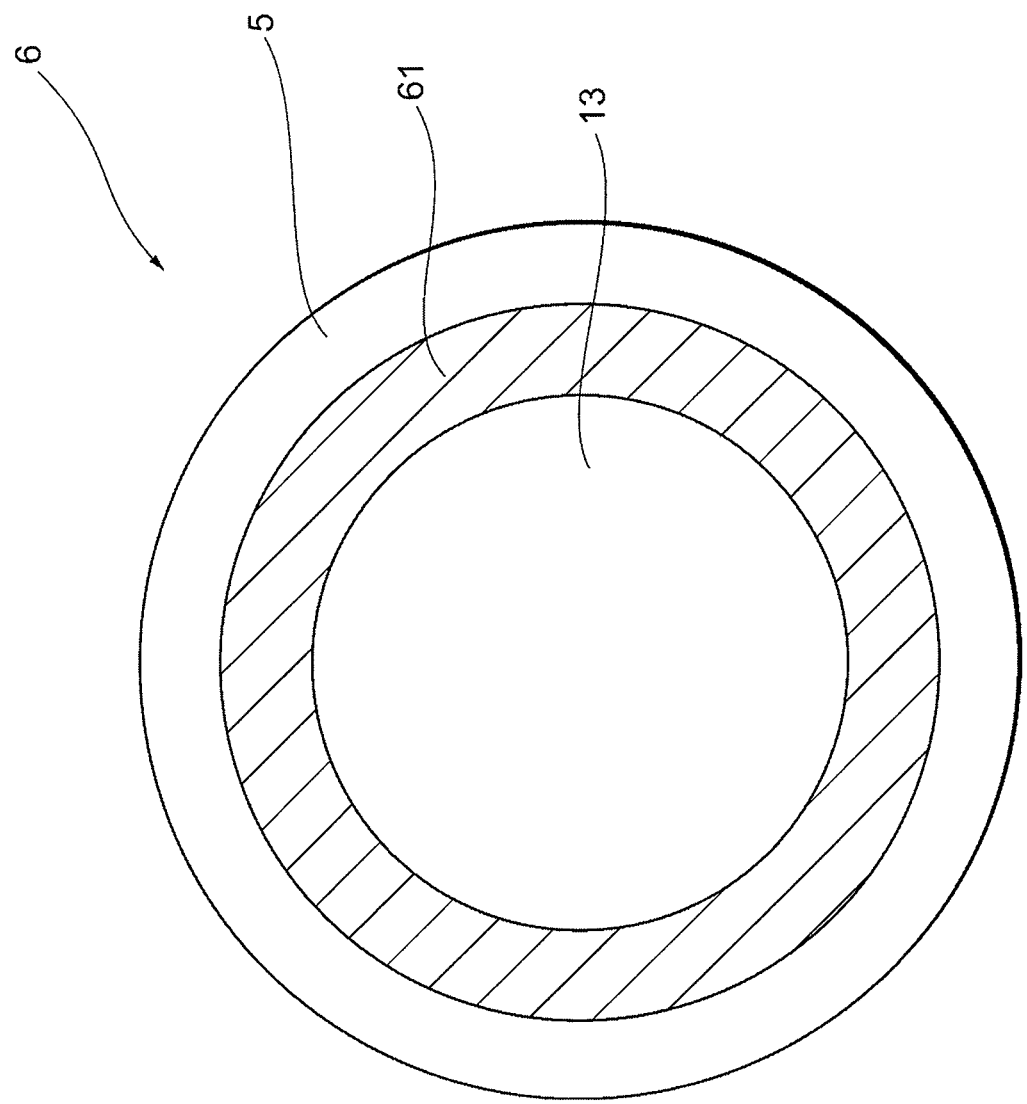
FIG. 16 is a cross-sectional view taken along line XXII-XXII of FIG. 1.

In a heat exchanger 2H that is shown in FIG. 14 as a comparative example, a refrigerant adjustment portion 6H is not inserted into a liquid reservoir 5H, and the refrigerant adjustment portion 6H is separately provided above the liquid reservoir 5H. As shown in FIG. 15, the refrigerant adjustment portion 6H requires a fixation member 64H to fix a body portion 61H to an upstream heat exchanging portion 3. Further, a valve coupling component 63H is required for fixing the body portion 61H to the fixation member 64. A sealing portion 65H is further required between the body portion 61H and the valve coupling component 63H. Therefore, each component occupies an extra space and the mountability is deteriorated. In contrast, as shown in FIG. 16, in the heat exchanger 2 according to the present embodiment, since at least a part of the refrigerant adjustment portion 6 is inserted into the liquid reservoir 5, complex structure is not required, and mountability can be significantly improved.

In the present embodiment, a sealing portion 63 is provided between the liquid reservoir 5 and the refrigerant adjustment portion 6 for preventing a leakage of the liquid-phase refrigerant from the liquid reservoir 5. Since multiple sealing portions 63 can be provided along the longitudinal direction of the liquid reservoir 5, a tolerance to corrosion in a height direction can be improved. Since the tolerance to corrosion in the height direction can be improved, it is possible to mount on the vehicle without extra space in the width direction and the depth direction, and without affecting other vehicle mounted parts.

In the present embodiment, the outflow channel 13 connecting the liquid reservoir 5 and the refrigerant adjustment portion 6, and letting the refrigerant to flow out from the liquid reservoir 5 to the refrigerant adjustment portion 6 is provided. The liquid reservoir 5 extends in the longitudinal direction along a lateral surface of the upstream heat exchanging portion 3 and the downstream heat exchanging portion 4. The refrigerant adjustment portion 6 is inserted into the liquid reservoir 5 from one end of the liquid reservoir 5. The outflow channel 13 extends in the longitudinal direction.

In the present embodiment, the intermediate portion 62 is provide between the liquid reservoir 5 and the refrigerant adjustment portion 6. An inner surface of the intermediate portion 62 facing the refrigerant adjustment portion 6 has a surface accuracy enough to keep a close contact with the sealing portion 63. Since the intermediate portion 62 is provided, the sealing property can be secured regardless of a condition of an inner surface of the liquid reservoir 5.

In the present embodiment, the refrigerant adjustment portion 6 includes the inserted end portion 6a inserted into the liquid reservoir 5 and the exposed end portion 6b formed on the end opposite from the inserted end portion 6a. The projected area of the inserted end portion 6a projected on a plane in the longitudinal direction is smaller than the projected area of the exposed end portion 6b projected on the plane in the longitudinal direction. With this configuration, it is possible to easily insert the refrigerant adjustment portion 6 into the liquid reservoir 5.

Figure 17:
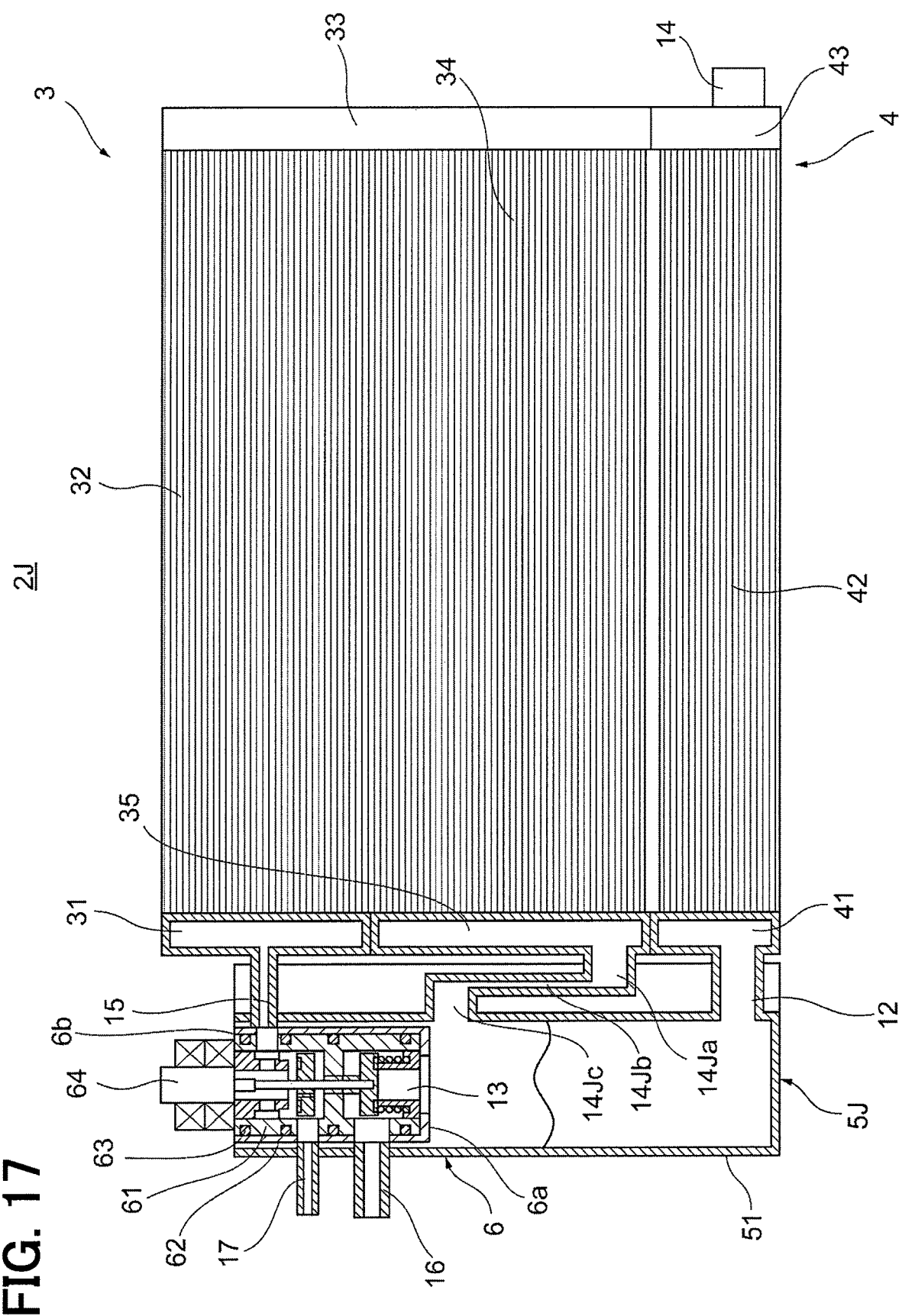
FIG. 17 is a view for explaining another example of a pipe of FIG. 1 according to the embodiment.

As shown in FIG. 17 as a modification example, inflow channels 14Ja, 14Jb, 14Jc through which the refrigerant flowing out of the upstream heat exchanging portion 3 flows into the liquid reservoir 5J can be provided. One end of the inflow channel 14Ja is connected to the header tank 35, and the other end is connected to the inflow channel 14Jb. The inflow channel 14Jb extends upward along the longitudinal direction of the liquid reservoir 5J. The inflow channel 14Jc is provided between the inflow channel 14Jb and the liquid reservoir 5J.

Figure 18:
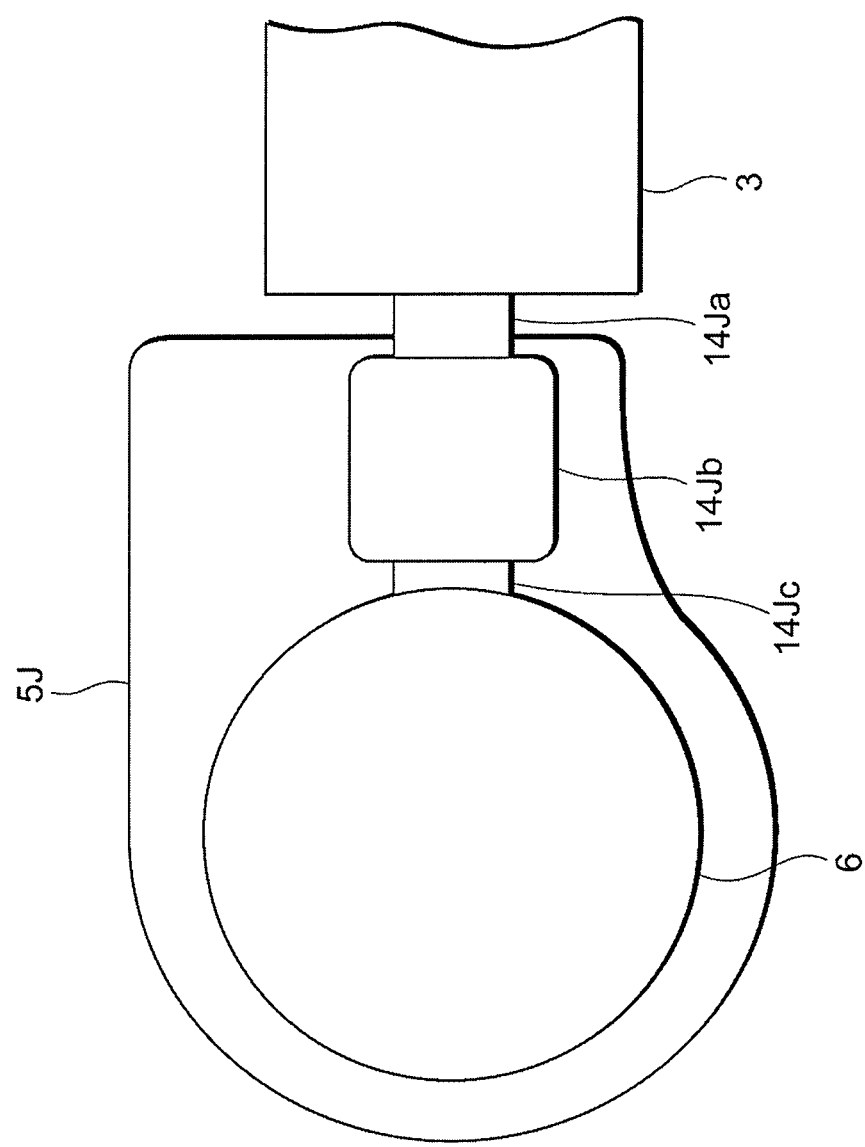
FIG. 18 is a view for explaining a condition in which a liquid reservoir and the pipe are integrally provided in FIG. 17.

At least a part of the inflow channels 14Ja, 14Jb, 14Jc is integrated with the liquid reservoir 5J. In order to explain the relationship between the liquid reservoir 5J and the return flow paths 14Ja, 14Jb, 14Jc, FIG. 18 schematically shows the positional relationship when the liquid reservoir 5J is viewed in the longitudinal direction of the liquid reservoir 5J. In the example shown in FIG. 18, the inflow channels 14Jb, 14Jc are integrated with the liquid reservoir 5J. In the example explained with reference to FIGS. 17 and 18, the liquid reservoir 5J is integrated with the flow channel through which the refrigerant flows into the liquid reservoir 5J, but the liquid reservoir 5J may be integrated with the flow channel through which the refrigerant flowing out of the liquid reservoir 5J.

Figure 19:
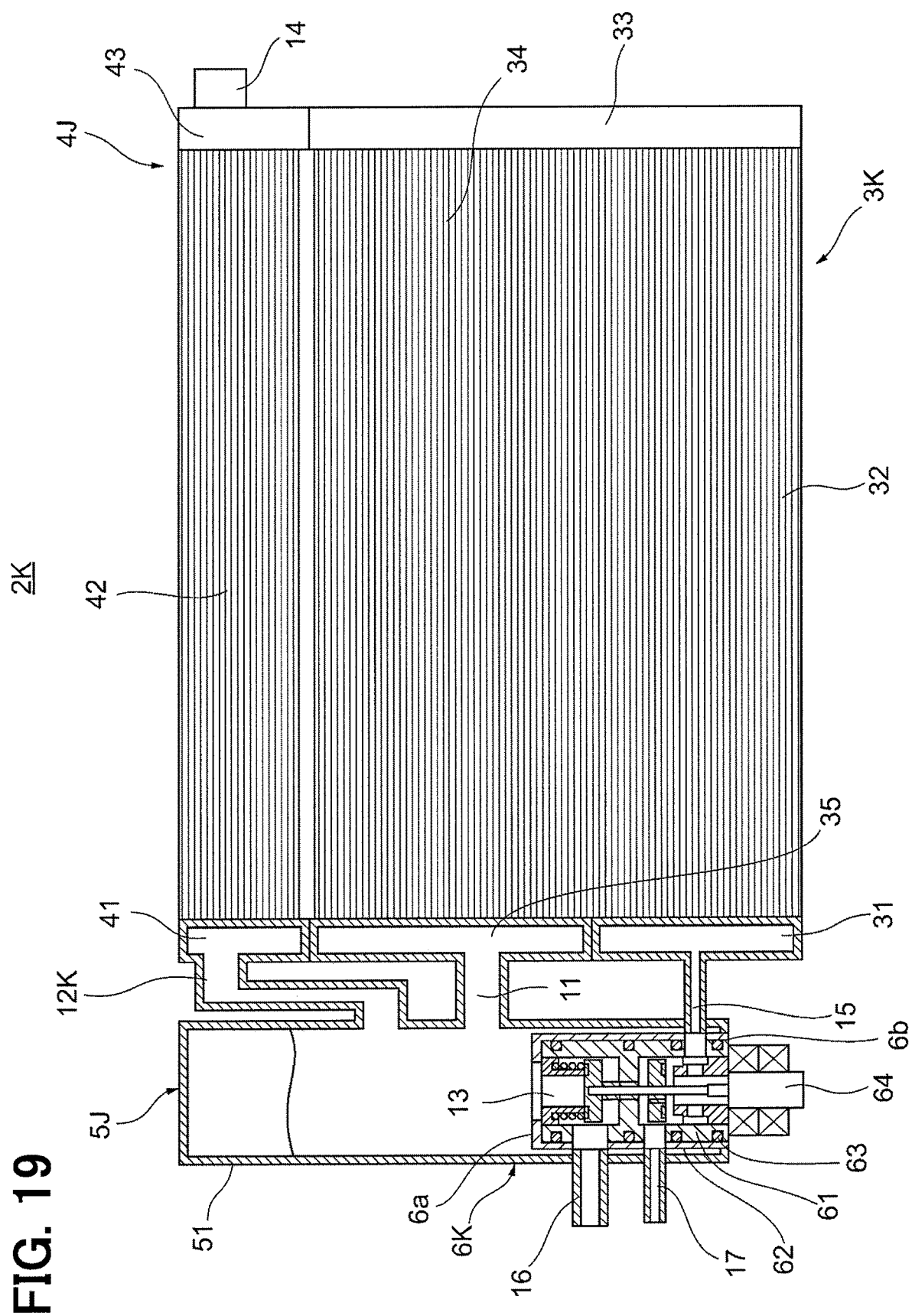
FIG. 19 is a view for another example where the embodiment shown in FIG. 1 is turned upside down.

In a heat exchanger 2K shown in FIG. 19, an upstream heat exchanging portion 3K is located below a downstream heat exchanging portion 4K. A bottom surface of the liquid reservoir 5K is above an opening end. A refrigerant adjustment portion 6K is inserted into the liquid reservoir 5K from the lower side. A connection channel 12K is bent so as to connect the liquid reservoir space of the liquid reservoir 5K and the downstream heat exchanging portion 4K.

The present embodiments have been described with reference to specific examples above. However, the present disclosure is not limited to these specific examples. Those skilled in the art appropriately design modifications to these specific examples, which are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

What is claimed is:

1. A heat exchanger for a refrigeration cycle, comprising:
a heat exchanging portion configured to exchange heat between a refrigerant flowing through therein and air;
a liquid reservoir arranged along a lateral surface of the heat exchanging portion and configured to separate a gas-liquid two-phase refrigerant flowing out of the heat exchanging portion into a gas-phase refrigerant and a liquid-phase refrigerant, the liquid reservoir storing the liquid-phase refrigerant;
a refrigerant adjustment portion that includes
a pressure regulator configured to adjust a flow state of the refrigerant flowing into the refrigerant adjustment portion through a refrigerant passage of the refrigeration cycle and supply the refrigerant to the heat exchanging portion, and
a flow rate adjustment valve configured to adjust an outflow state of the refrigerant flowing out of the liquid reservoir to the refrigeration cycle, wherein
the pressure regulator and the flow rate adjustment valve of the refrigerant adjustment portion are accommodated in the liquid reservoir;
the pressure regulator and the flow rate adjustment valve are integrated to be a single component;
the refrigerant adjustment portion defines therein an inflow channel through which the refrigerant flowing from the refrigerant passage of the refrigeration cycle toward the heat exchanging portion flows;
the heat exchanging portion includes an upstream heat exchanging portion and a downstream heat exchanging portion; and
the liquid reservoir includes
a first inlet connected to the refrigerant passage of the refrigeration cycle such that the refrigerant flows from the refrigerant passage of the refrigeration cycle into the pressure regulator,
a first outlet connected to the upstream heat exchanging portion such that the refrigerant flowed through the pressure regulator flows into the upstream heat exchanging portion,
a second inlet connected to the upstream heat exchanging portion such that the refrigerant flowed through the upstream heat exchanging portion flows into the liquid reservoir,
a second outlet connected to the refrigerant passage of the refrigeration cycle such that the refrigerant flowed through the flow rate adjustment valve flows into the refrigerant passage of the refrigeration cycle, and
a third outlet connected to the downstream heat exchanging portion.

2. The heat exchanger according to claim 1, wherein
a liquid reservoir space that stores the refrigerant is defined in the liquid reservoir, the liquid reservoir space extending in a longitudinal direction of the liquid reservoir from one end of the liquid reservoir close to the inflow channel to another end of the liquid reservoir farther from the inflow channel,
a connection channel through which the refrigerant flowing from the heat exchanging portion to the liquid reservoir flows is connected to an inflow port of the liquid reservoir, and
the inflow port is closer to the one end than to the other end.

3. The heat exchanger according to claim 2, wherein
a void space is provided between the refrigerant adjustment portion and another component which is in contact with the refrigerant adjustment portion, the void space being positioned between the inflow channel and the liquid reservoir space.

4. The heat exchanger according to claim 3, wherein
the void space is provided by a buffer member interposed between the refrigerant adjustment portion and the another component which is in contact with the refrigerant adjustment portion.

5. The heat exchanger according to claim 2, wherein
the refrigerant adjustment portion includes a void space inside the refrigerant adjustment portion, the void space being positioned between the inflow channel and the liquid reservoir space.

6. The heat exchanger according to claim 1, wherein
a liquid reservoir space that stores the refrigerant is defined in the liquid reservoir, the liquid reservoir space extending in a longitudinal direction of the liquid reservoir from one end of the liquid reservoir close to the inflow channel to another end of the liquid reservoir farther from the inflow channel,
the heat exchanger further comprising:
sealing portions provided between the liquid reservoir and the refrigerant adjustment portion in a width direction intersecting the longitudinal direction, the sealing portions preventing the liquid-phase refrigerant from leaking from the liquid reservoir, wherein
the sealing portions are provided along the longitudinal direction
between inner passages of the refrigerant adjustment portion where a destination of the refrigerant in the inner passages is switched,
between the inner passages and outside air, and
between the inner passages and the liquid reservoir space.

7. The heat exchanger according to claim 6, further comprising:

an intermediate portion provided between the liquid reservoir and the refrigerant adjustment portion, wherein an inner surface of the intermediate portion facing the refrigerant adjustment portion has a surface accuracy that secures close contact with the sealing portion.

8. The heat exchanger according to claim 6, wherein
the refrigerant adjustment portion includes
  an inserted end portion inserted into the liquid reservoir, and
  an exposed end portion opposite from the inserted end portion, the exposed end portion being exposed from the refrigerant adjustment portion, wherein
an area of the inserted end portion projected on a plane in the longitudinal direction is smaller than an area of the exposed end portion projected on the plane in the longitudinal direction.

9. The heat exchanger according to claim 6, further comprising:
a flow channel through which the refrigerant flowing in or out of the liquid reservoir flows, wherein
at least a part of the flow channel is integrated with the liquid reservoir.

\* \* \* \* \*